Dec. 30, 1958     C. W. BRANDON     2,866,509
APPARATUS FOR TREATING OIL BEARING FORMATIONS
Filed June 27, 1952     10 Sheets-Sheet 1

Clarence W. Brandon
INVENTOR.

Clarence W. Brandon
INVENTOR.

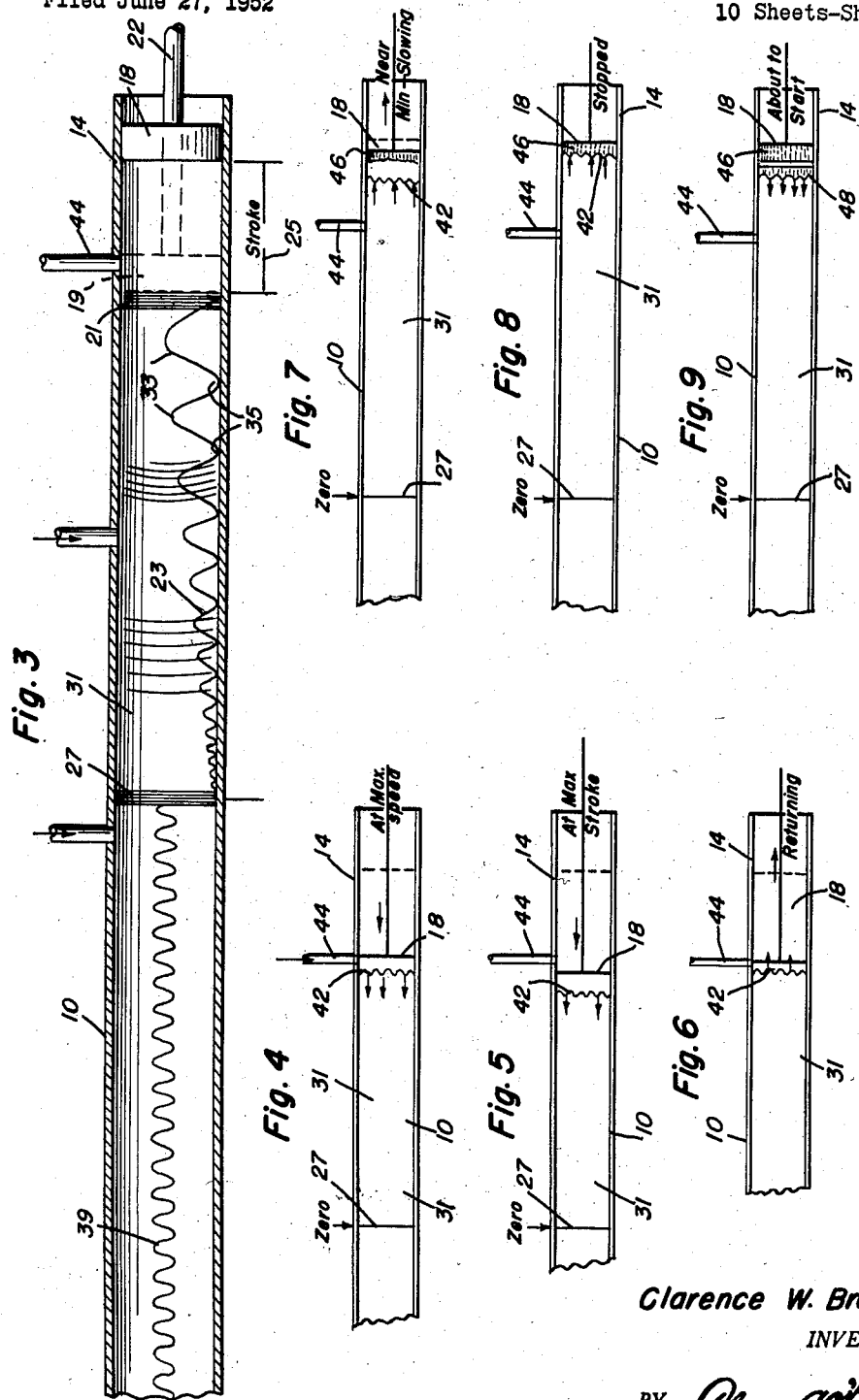

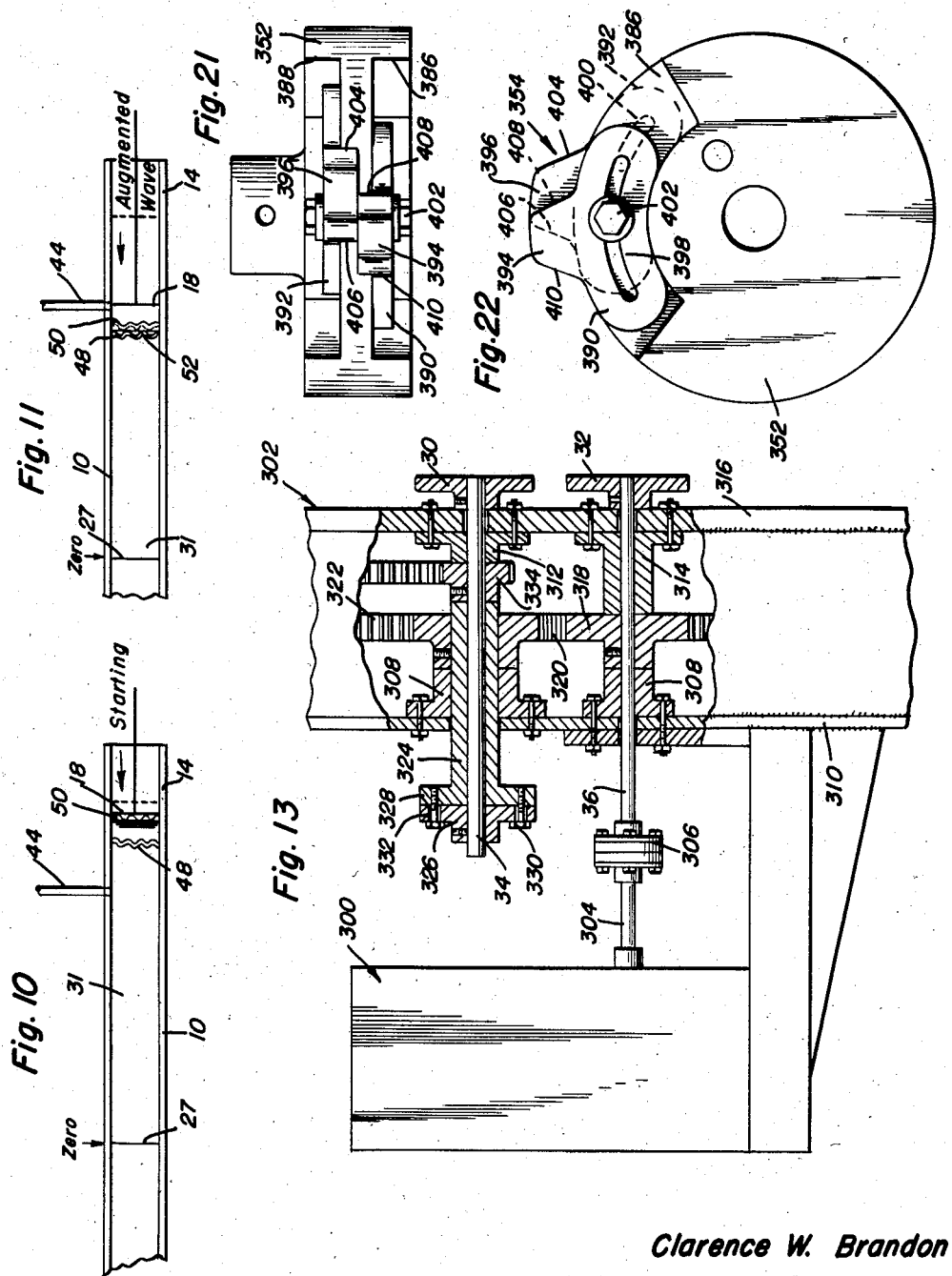

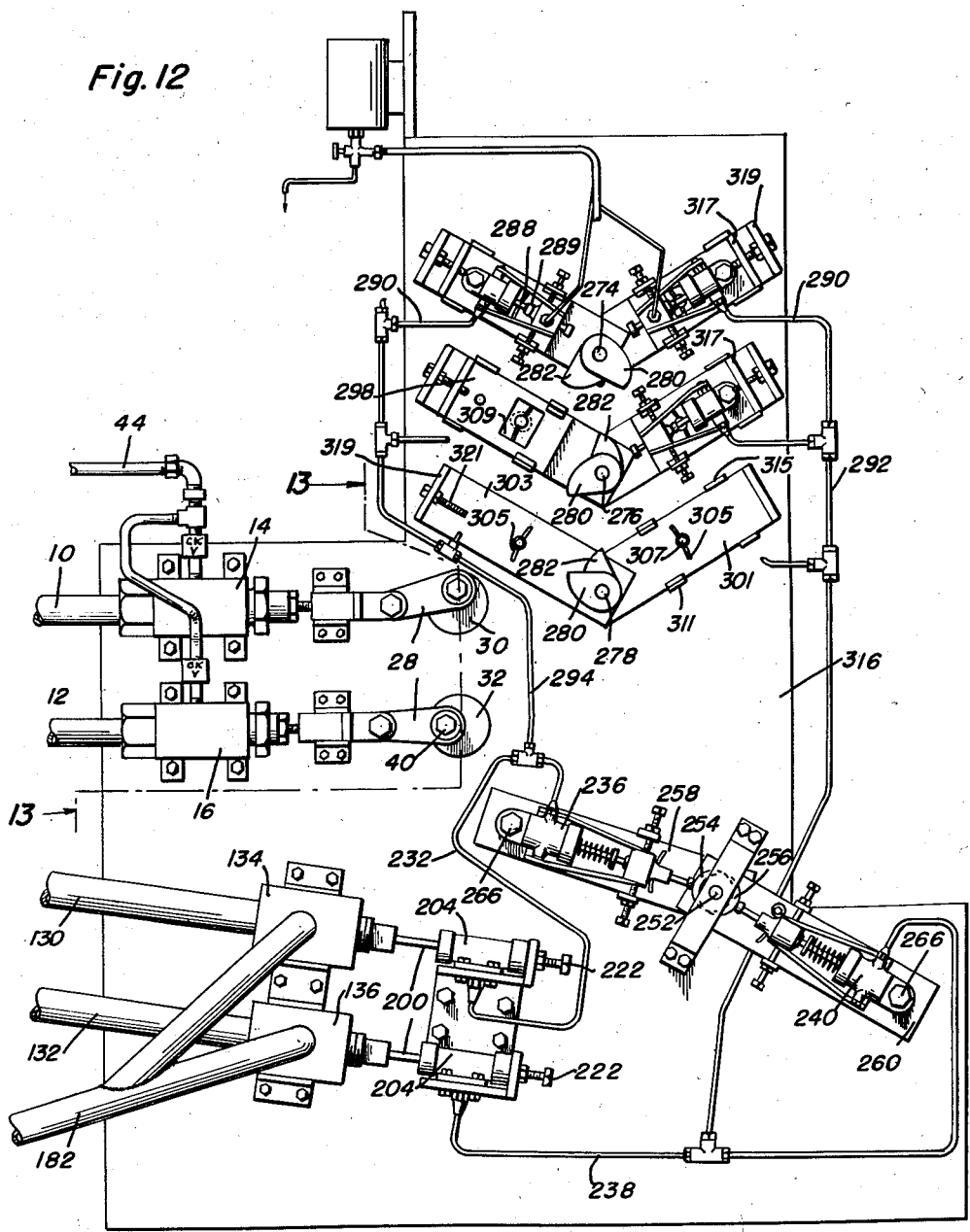

Dec. 30, 1958 C. W. BRANDON 2,866,509
APPARATUS FOR TREATING OIL BEARING FORMATIONS
Filed June 27, 1952 10 Sheets-Sheet 8

Clarence W. Brandon
INVENTOR.

BY

Dec. 30, 1958  C. W. BRANDON  2,866,509
APPARATUS FOR TREATING OIL BEARING FORMATIONS
Filed June 27, 1952  10 Sheets-Sheet 9

Clarence W. Brandon
INVENTOR.
BY
Attorneys

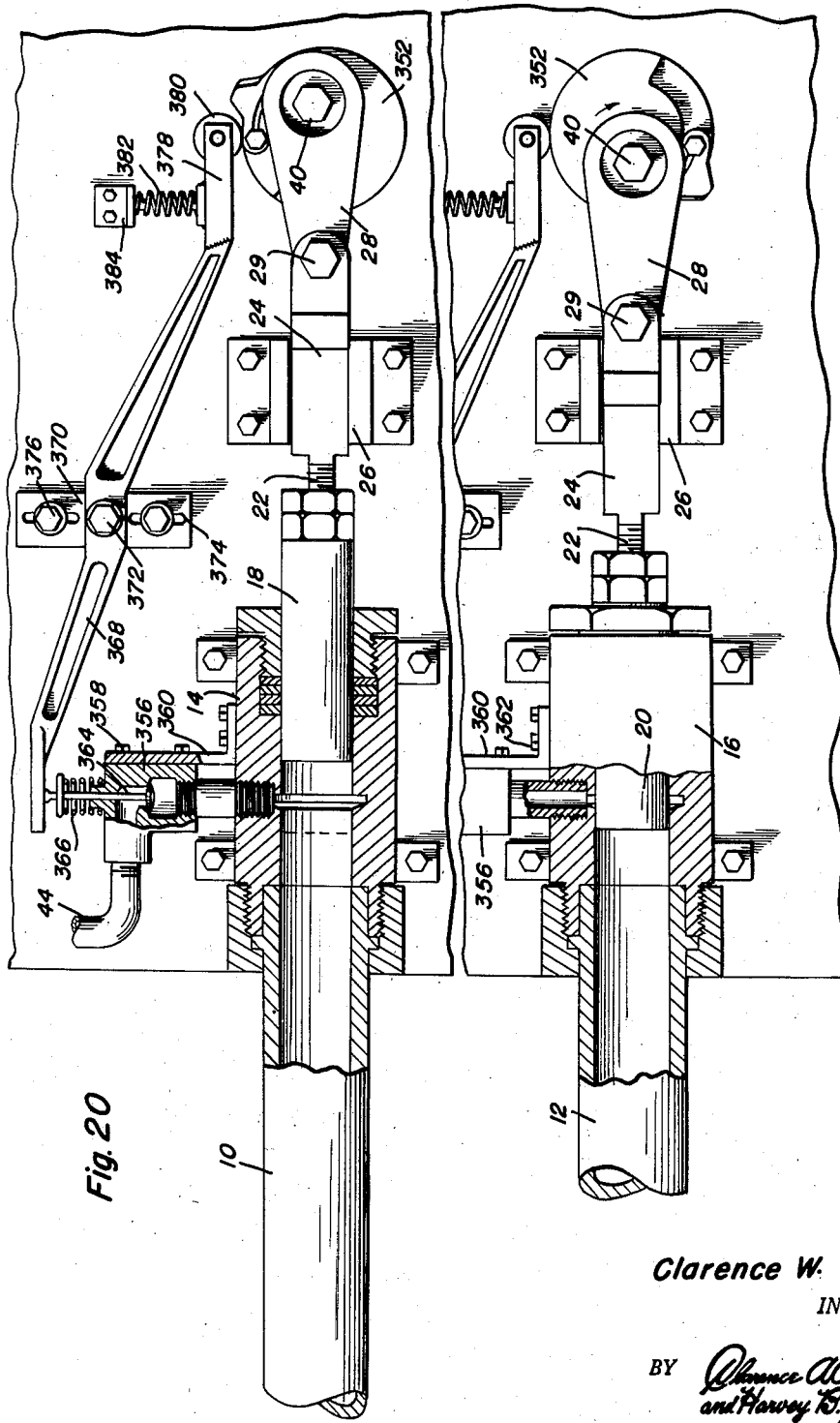

United States Patent Office 2,866,509
Patented Dec. 30, 1958

2,866,509

APPARATUS FOR TREATING OIL BEARING FORMATIONS

Clarence W. Brandon, Tallahassee, Fla., assignor of five percent to Harvey B. Jacobson, Washington, D. C., and fifty percent to N. A. Hardin, Hazel H. Wright, and Catherine H. Newton, and twelve and one-half percent to Orpha B. Brandon, all of Tulsa, Okla.

Application June 27, 1952, Serial No. 296,038

29 Claims. (Cl. 166—177)

This invention comprises novel and useful improvements in an apparatus for treating oil bearing formations and relates to an apparatus for producing high frequency vibrations in the form of waves of predetermined controllable characteristics in an elastic wave transmitting medium, especially pertaining to an apparatus of this character which is suitable for treating oil bearing formations, and is generally similar in subject matter to that set forth in my prior copending application, Serial No. 241,647, filed August 13, 1951, now Patent 2,796,129 issued June 18, 1957, for Oil Recovery Process; and constitutes improvements over the apparatus set forth in said application.

The primary and fundamental object of this invention is to provide an apparatus which shall be capable of generating in an elastic energy transmitting medium, a high frequency wave vibration of predetermined characteristics as to the form of the wave, in an improved, readily controlled and readily varied manner.

An extremely important purpose of this invention is to devise an apparatus whereby a piston or other periodically moving power input member, during a single actuation of the same, will produce an augmented energy impulse in a periodic wave.

Yet another very important object of the invention is to provide a wave generating apparatus wherein a single piston or other energy input member is caused to impart two separate energy impulses in adjustable and controllably timed relation into the same vibratory cycle of a wave.

A further important object of the invention is to provide an apparatus for producing a reinforced wave in a transmitting medium by the simultaneous generation of a plurality of separate waves and by the combining of these separate waves in predetermined phase relations as desired, and with accuracy and precision as to the phase relationship of the component and resultant waves.

A further general object of this invention is to provide a hydraulic system having a pulsating, energy input displacement member with a hydraulic means for varying the effective position of the displacement member for a given stroke or strokes thereof.

An additional specific object of this invention is to provide in an apparatus in conformity with the foregoing objects and which has a piston and piston rod for producing periodic waves in a fluid medium, a means for periodically introducing, or removing, in timed relation to the movement of the piston, additional fluid in front of the piston to thereby vary the effective length of the piston rod.

A further important object of the invention is to provide an apparatus in accordance with the foregoing objects, wherein provision is made for the introduction of water or similar desired elastic fluid into the wave transmitting medium, with a minimum requirement for the expenditure of additional work to effect such introduction and with a minimum adverse effect upon the characteristics of the wave produced by the apparatus during this fluid introduction and to effect the fluid introduction during the generation of the wave.

An additional important object of the invention is to provide an apparatus wherein carbon dioxide, or other highly volatile liquids as desired, for use in treating an oil bearing formation, can be introduced into the wave transmitting medium by the apparatus, during and without interrupting the generation of a wave, and with a minimum adverse effect upon the characteristics of the wave being produced.

A still further important object of the invention is to provide an apparatus in conformity with the foregoing objects in which provision is made for the introduction of heat energy into the wave transmitting medium in such a manner that there will be little or no heating effect upon the apparatus itself, or upon the wave transmitting medium, and whereby the heat energy introduced may be delivered to the energy receiving medium, which may be, as for example, an oil bearing formation which has been flooded or treated by a water drive or is otherwise in energy receiving contact with the apparatus through an elastic medium.

An important object is to provide an actuator for a hammer valve wherein the speed and duration of the opening stroke of the hammer valve may be controllably varied relative to the speed and duration of the closing stroke.

Another very important object is to provide an actuator, for a hammer valve that is employed in applying hammer shock waves to an oil bearing formation and in controlling flow of matter from the formation, which shall be capable of obtaining periodic relatively larger openings of the hammer valve to permit the passage of larger particles of matter therethrough, but of shorter duration, whereby no appreciable loss of pressure in the medium controlled by the hammer valve will be experienced.

A more specific object is to provide an actuator as set forth in the immediately preceding objects wherein the closing stroke of the hammer valve may be adjustably prolonged and slowed to enable the fluid passing through the hammer valve to thoroughly cleanse its seat.

Still another more specific object is to provide an actuator for a hammer valve that is employed in applying hammer shock waves to an oil bearing formation, which shall be capable of causing a rapid and abrupt closing movement of the hammer valve to deliver a crushing hammer blow to hard formation; or to apply slower closing movements to the hammer valve to lessen the force of the hammer blow applied to softer formations and/or to the well casing.

The invention has as an additional object the provision of an apparatus for producing a high frequency wave in an elastic medium for treating formations whereby the lateral extent or scope of action of a longitudinally traveling wave may be greatly broadened by the application of timed, reinforcing hammer shocks to the wave.

A further important object of the invention is to provide an apparatus capable of producing a primary wave of predetermined characteristics in an elastic transmitting fluid medium; and which shall also be capable of imposing upon and combining with the primary wave a secondary wave or waves also of predetermined controllable characteristics in the form of hammer shocks imposed upon the primary wave, to reinforce the same.

Yet another object of the invention is to provide an apparatus as set forth in the preceding object which shall include improved means for varying the phase relationships of the secondary or hammer shock waves with respect to each other.

A still further important object of the invention is to provide an apparatus in accordance with the preceding objects which shall have provision for readily and accurately varying the phase relationship between the various component waves which constitute the primary wave.

Another extremely important object and feature of this invention is to provide an apparatus capable of maintaining mean pressures in a confined elastic medium at a very remote distance from the energy input station with relative small loss of pressure therebetween.

Yet another important object and feature of my invention is to provide an apparatus to transmit energy in the form of high frequency waves through an elastic medium for long distances and with low transmission loss.

A further important and fundamental purpose of this invention is to provide an apparatus which shall produce in an elastic wave transmitting medium a traveling wave in contrast with a standing wave.

Still another object of my invention resides in the provision of an apparatus which shall produce, in an elastic wave transmitting medium, a traveling wave capable of facilitating longitudinal travel through the medium of foreign materials, whether solids, liquids or gases, and which are of a different specific density from that of the medium.

These, together with various ancillary features and objects of the invention, which will later become apparent as the following description proceeds, are attained by the present invention, a preferred embodiment of which has been illustrated, by way of example only, in the accompanying drawings, wherein:

Figure 3 is an enlarged diagrammatic view of one of the primary wave input members showing in vertical section a cylinder, piston and associated conduit and diagrammatically representing the displacement and sound wave produced in the medium;

Figures 4–11 are diagrammatic views depicting successive phases in the operation of an energy input member when augmenting a wave;

Figure 12 is an elevational view of a portion of the apparatus showing the relative positions of the primary and secondary input members and their actuating mechanisms and showing further structural details thereof;

Figure 13 is a vertical transverse sectional view taken substantially upon the plane indicated by the broken section line 13—13 of Figure 12 and showing the power driving mechanism of the apparatus;

Figure 20 is a fragmentary view similar to Figure 2 and showing in section a modification for positively actuating the feed water valves;

Figure 21 is an enlarged fragmentary elevational view of the adjustable cam forming a part of the embodiment of Figure 20; and Figure 22 is an enlarged top plan view of the adjustable cam of Figure 21.

*General principles of the invention*

Figure 1:
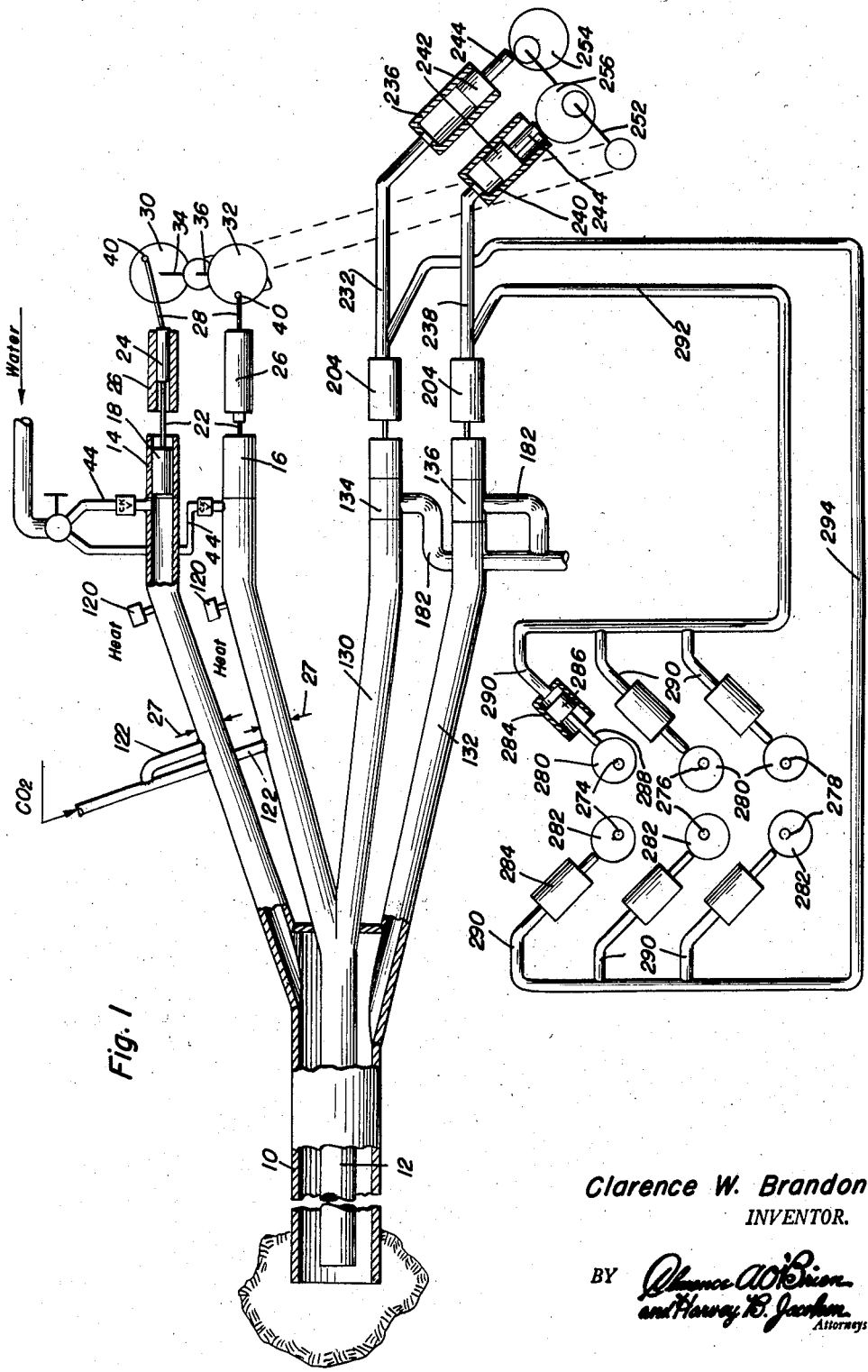
Figure 1 is a diagrammatic view, chiefly in elevation, with parts broken away and parts shown in section of the entire installation of one embodiment of the invention.

Briefly stated, the fundamental purpose of this invention, in its broadest aspect, is to transmit energy by means of an elastic wave transmitting medium from an energy emitting member or energy input station to an energy receiving member or station for use of the energy, which energy receiving station may comprise an oil bearing formation. In accomplishing this fundamental purpose, I effect the input of energy into a wave transmitting medium, in the form of high frequency or periodic waves of controllable and predetermined characteristics; and deliver or discharge the energy content of these waves in various forms such as heat, pressure, velocity and the like to selected and predetermined energy receiving mediums.

The principles of the invention set forth hereinafter are broadly applicable to various elastic wave transmitting mediums, as for example, solid, fluid and liquid mediums. The only essential requisite for the purpose of this invention, is that the mediums shall be of an elastic nature, and consequently capable of propagating a wave motion therethrough in the form of high frequency, energy carrying waves.

A very important application of the broad principles of this invention to a specific use, disclosed in detail hereinafter in this application, comprises an apparatus specifically adapted for applying energy to a liquid medium for producing therein periodic high frequency energy bearing waves for treating oil bearing formations which are in wave receiving contact and energy receiving contact with the liquid transmitting medium.

The above mentioned general purpose and principles of the invention and their above mentioned more specific application, in accordance with this application, are effectively obtained by an apparatus disclosed in the accompanying drawings and described in detail hereinafter.

The particular forms of apparatus disclosed in this application are to be regarded merely as exemplifications only of suitable manners of applying the principles of this invention. The apparatus comprises essentially two assemblies, the first consisting of means for producing a primary wave in a liquid transmitting medium while the second assembly consists of means for producing secondary waves in the transmitting medium, which secondary waves are imposed upon and combined with the primary waves in a controlled time and phase relationship in order to produce a compounded or resultant wave.

The means for producing the primary wave, as illustrated in the drawings, consists of a plurality of separate wave generators, each of which produces a component wave having controllable predetermined characteristics as to amplitude and frequency, the individual generators of the component waves being capable of adjustment and combining in various phase relationships to produce desired resultant primary waves.

The means for generating the secondary waves, in the apparatus disclosed, consists of a plurality of controllable valves for producing hammer shocks in the liquid medium, there being one or more of such valves for each of the component wave generators of the primary wave.

As used in this specification and claims, the terms "high frequency" identifies frequencies of vibration ranging upward from 15 per second, although in exceptional circumstances they may range upward from 1 per second. The term "displacement portion of the medium" refers to that portion of the liquid column or elastic medium in which the particles of the medium are displaced to and fro longitudinally under the impulses of the pistons or other energy input members which produce the component waves of the primary wave. The "displacement wave" is the wave formed by the series of compressions and rarefactions propagated in the "displacement portion" by the impulses of the energy input members and of course travels to and fro longitudinally of the medium.

The "zero point" of the medium designates that region in the medium at which the longitudinal to and fro movement of the particles, or in other words the displacement wave motion, substantially ceases, and the energy of the displacement wave leaves the "displacement portion" and passing into the rest of the medium is converted to a high frequency sound wave. Finally, the term "augment" is used to designate the act of a single piston or other energy input member in imparting separate energy impulses to a wave in the same vibratory cycle of the wave for increasing the energy content of the wave.

Reference is now made more specifically to the accompanying drawings, wherein like numerals designate similar parts throughout the various views, attention being more specifically directed to the construction of the apparatus disclosed in Figures 1–3, 12–17.

The numerals 10 and 12 indicate concentric outer and inner pipes or conduits, which at one end are in operative contact with the oil bearing formation and at their other ends are in operative engagement with the wave generating apparatus. It will be understood that the pipes 10 and 12 will be at all times completely filled with the liquid medium for transmitting vibrations and wave energy to the formation, this liquid medium being maintained under any desired predetermined minimum standing pressure which it is desired to apply to and maintain upon the oil bearing formation.

Although I have illustrated in the drawings the termination of the ends of pipes 10 and 12 adjacent to an oil bearing formation and at a point remote from the wave generating means, it is also apparent that I may terminate the end of the inner pipe 12 closely adjacent the wave generating apparatus and at any convenient distance beyond the zero point of the two pipes 10 and 12, which zero point is referred to in greater detail hereinafter. Further the pipes 10 and 12 could be in side by side relation rather than concentric. It is also obvious that the principles of the invention are not limited to any particular lengths or proportions of the pipes, and that these can be chosen and selected as found to be expedient by experiment.

*Primary wave generator*

The primary wave is the resultant wave produced by a plurality of component wave generators, each capable of producing a separate periodic wave, of variable predetermined characteristics, in an elastic medium. Where only one component wave generator is operated, the primary wave will of course be the actual wave produced by that generator. In general, however, the separate component waves of two or more component wave generators will be combined to give a resultant wave constituting the primary wave.

Figure 2:
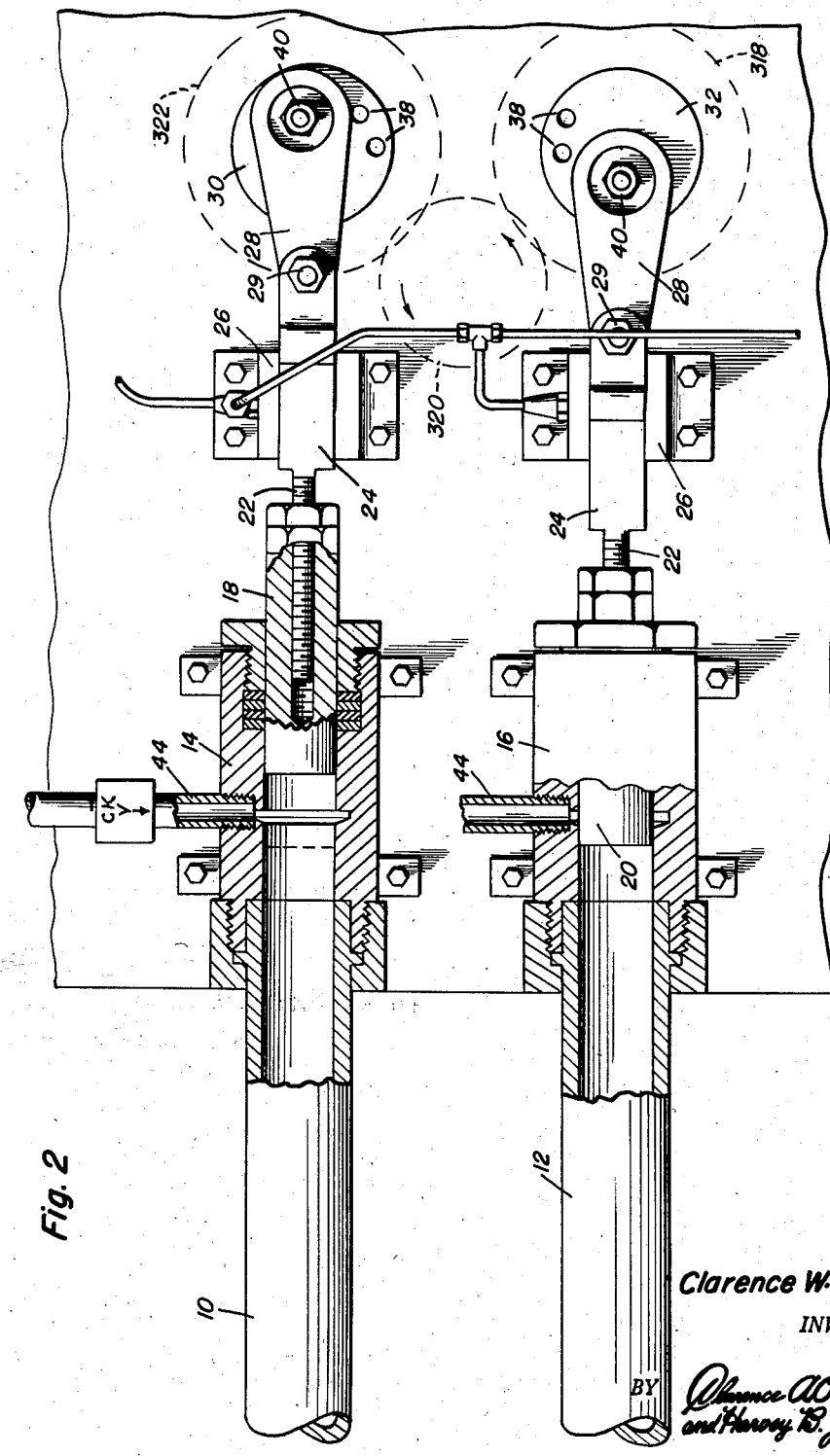
Figure 2 is an enlarged detail view in vertical section, with parts in elevation, of the two power input pistons with their associated cylinders, conduits and operating means.

The structure and principles of operation of the primary wave generator are shown in Figures 1–13, and 18–22. As shown in Figure 2, the outer ends of the pipes 10 and 12 terminate respectively in removable cylinders 14 and 16, receiving reciprocatory pistons 18 and 20 respectively which constitute the energy input members of the two component wave generators producing the primary wave. Each of the pistons 18 and 20 are provided with a piston rod 22 which is preferably adjustably screw threaded into the piston whereby the length of piston rod and the position of the piston in its cylinder may be variable and is securely attached to a piston rod slide or crosshead 24, each of these slides being longitudinally reciprocated in the stationary guide 26. A connecting rod 28, as shown in Figure 1, is pivotally attached at 29 to each of the piston rod guides 24 and to crank discs 30 and 32 on a pair of crank shafts 34 and 36. The stroke imparted to the pistons is varied by radially adjusting the pivotal connection of the connecting rod relative to the axes of the crank shafts.

As illustrated in Figure 2, the variation in the stroke of the pistons is effected by means of a plurality of screw threaded apertures 38 in the discs 30 and 32, in which are received bolts or pivots 40 by which the connecting rods are journaled upon the discs, the apertures 38 being at different radial distances from the axis of rotation of the crank disc.

By means of the driving mechanism set forth in Figure 13, and which is specifically referred to hereinafter, the crank shafts 34 and 36 are interconnected and are rotated at the same speed but are relatively rotationally adjustable. The adjustability of the crank shafts enables the imparting of a controllable adjustable lead to one of the pistons 18 and 20. Through this adjustment, in conjunction with adjustments of the length of the connecting rods, of the lengths of the piston rods and of the speed of the crank shafts, any desired phase relationship of the pistons to each other and/or to the waves produced in the elastic medium can be obtained. Thus, the maximum component waves can be produced and combined to become the maximum primary wave.

Each piston, because of its reciprocation while in direct contact with the liquid medium, will apply a periodic displacement and vibration to the medium and thus produce a periodic wave therein. Consequently, the two waves produced in the mediums by the two pistons will be controllable but out of phase with each other to an extent which is proportionate to the lead of the relative timing of the pistons.

For the purpose of this exposition of the apparatus and its operation, either of these pistons may be regarded as the basic input member producing a basic component wave while the other constitutes the auxiliary input member producing an auxiliary component wave. The two component waves thus produced will obviously be of frequencies which are identical with, or are an integer multiple of each other, whereby a combined or resultant wave will be produced which in the specification and in the appended claims is referred to as the primary wave.

Inasmuch as the speed and acceleration of a piston at different portions of its cycle, when connected to a crank shaft by a connecting rod, will vary in accordance with changes in the length of connecting rods, and/or crank throws, I prefer to form the connecting rods and crank throws of an adjustable length, in order to obtain various accelerations or rates of speed change in a reciprocation of the pistons. The variability of the length of the connecting rods and of the crank throws is obtained by any suitable mechanism, as for example, that shown in Figures 18 and 19, which will be subsequently specifically considered.

The various particles of an elastic medium possess inertia. This is especially true of the relatively heavy particles of a liquid medium, such as water, petroleum, or a mixture of both with which the present invention is particularly concerned. I make use of this property of the particles of the medium to controllably impress additional or augmenting energy upon the waves generated in the medium by my apparatus, as will be better understood by reference to Figures 4–11 which diagrammatically illustrate this method and operation.

Before proceeding with the detailed description of the intricate steps which apparently occur in the complex process of augmentation, it is believed that a brief and general summary of the operation of a reciprocating piston in a fluid medium will be helpful in obtaining a general comprehension of the process.

The acceleration of the piston upon its outstroke compresses the medium particles adjacent the piston into the crest of a compression or displacement wave. As the piston slows and then reverses its motion, the crest, because of its momentum, lags behind the piston, forming a rarefaction zone therebetween, and the lagging compression crest and rarefaction zone of the displacement wave also reverse their motion and follow the piston upon its instroke.

As the rarefaction zone reaches the liquid inlet 44, a charge or slug of feed water may, if desired, be fed into the rarefaction zone adjacent the piston face.

Adjacent the inward dead center of the piston, the following compression crest and rarefaction of the displacement wave overtakes and impacts against the slowing piston, and the slug of feed water if the latter has been introduced into the rarefaction zone. While the piston is relatively stationary at its inward dead center, the returning displacement wave "bounces" off the piston face, and the slug of water if introduced, and is reflected therefrom producing a new and reflected displacement wave from the returning displacement wave.

Since the piston is substantially stationary as the returning displacement wave is "bounced" or reflected therefrom, the reflected displacement wave travels out from the piston which thus lags behind. As the piston accelerates on its next outstroke it overtakes the reflected wave and imparts a thrust to the compression crest thereof, thereby increasing its energy content.

This action of causing an incoming wave to "bounce" from the piston to cause the initial energy input to the crest of a reflected wave and thereafter again apply energy to that same crest of a reflected wave by the same piston is the essence of augmentation. By this process it is possible to apply more energy to the same wave crest, in the same wave by a single piston.

With the foregoing general explanation in view, attention is now directed specifically to the diagrammatic view of Figure 3. It will be seen that as the piston 18 travels with acceleration upon its outstroke, away from its crank shaft, it displaces the particles of the medium directly in front of it, thus producing a longitudinally traveling compression zone 21 of greater particle density in the medium. The displacement of the particles in this region in turn displaces and compacts or compresses the next outward layer of particles, this continuing until the piston has reached its position 19 of maximum velocity. The outward travel of the compression zone 21 in the medium constitutes the displacement wave indicated at 23 whose amplitude as depicted in Figure 3 progressively diminshes outwardly from the piston.

From Figure 3 it will also be evident that the actual longitudinal displacement of the medium particles vary from a maximum, in the region 21 at the piston face, which is at least equal to the piston stroke 25, to a length which decreases to substantially zero at a distance from the piston. This "zero point" which is the place at which longitudinal displacement of the medium particles substantially ceases, is shown at 27. At this point the energy of the displacement wave 23 in the displacement portion 31 of the conduit is converted into a sound wave 39 in the non-reciprocating portion of the medium. The successive wave crests and rarefactions are shown respectively at 33 and 35.

Attention is now directed to the diagrammatic views of Figures 5-11 which show successive stages in the cycle of operation of the piston of input members during augmenting of a wave.

In Figure 4, the piston 18 has reached that portion of its outstroke where it is moving at maximum velocity. A compression zone 42, corresponding to the zone 21 previously mentioned in connection with description of Figure 3 has been formed by the compressing or compacting of the medium particles at the face of the advancing piston, and the compression zone 42 is the front of a displacement wave which begins leaving the face of the piston as the latter is slowing down upon the last portion of its outstroke.

The displacement wave, as shown by the arrows at the compression zone or crest 42, is traveling in the displacement portion 31 of the conduit towards the zero point 27.

In Figure 5, which illustrates the conditions existing a fraction of an instant after the conditions of Figure 4, the piston has completed its outstroke to its outer dead center position at a speed less than its maximum speed, and because of inertia, the compression front 42 of the displacement wave is still traveling at substantially the maximum rate of travel of the piston from the piston from the impulse given it during the position of Figure 4, and the compression zone 42 has now increased its distance from the piston 18, thus producing a rarefaction between itself and the piston.

At a slightly later interval of time, as shown in Figure 6, the piston has reversed its direction of motion and is now moving inwardly upon its return stroke, and the compression zone 42 is likewise, under the compression energy stored in the elastic medium in the displacement portion of the conduit 10, also moving inward and following the piston, there still being a rarefaction between this zone and the face of the piston.

Also as shown in Figure 6, the piston has uncovered the feed water inlet line 44 from which water or other liquids may now be added to the liquid medium, if desired, from any suitable source into the cylinder 14. At the position in Figure 6, the suction or rarefaction existing in the region between the compression zone 42 and the piston 18 will materially facilitate an inflow of feed water. A non-return check valve or other valve as desired is provided in the line 44 closely adjacent its entry into cylinders 14 and 16 to permit inward flow of feed water, but prevent movement of liquid from the cylinder into the line 44.

In the later interval of time, as shown in Figure 7, the piston 18 is approaching its inward dead center position, and is slowing down, taking with it a slug or adjustable charge of feed water, if additional water was introduced, as set forth above, which charge is diagrammatically indicated at 46 while the still advancing compression zone 42 is nearing but has not yet reached the piston and its new charge of feed water.

However, when the piston 18 as shown in Figure 8 has reached or is adjacent its dead center position and is now substantially stationary, the zone 42 impacts against the charge of feed water 46 and the stationary piston 18 and is reflected or "bounced" therefrom.

As the crank shaft travels through its dead center position, and while the piston is still approximately stationary, as shown in Figure 9, the incoming compression zone 42 which has the characteristics of a reflected wave, is "bounced" or again reflected and reverses its direction of travel, as shown by the arrows. Consequently a new and reflected compression zone 48 is produced which includes a portion of the additional charge of feed water 46, if the latter has been taken into the cylinder, and now begins to leave the piston and travel outwardly toward the zero point 27.

As shown in Figure 10 the piston 18 now begins to again move upon its outstroke, carrying with the medium particles adjacent to the piston face in the form of a new compression zone or wave crest 50. It will be noted however that the wave crest 50 which is slowly accelerating with the increasing speed of piston travel, is still dropping or lagging behind the reflected wave compression zone 48.

At a slightly later time interval, as shown in Figure 11, as the piston approaches or passes through that portion of its travel where it attains maximum speed, the new compression zone 50 overtakes and is driven into and combined with the receding reflected wave compression zone 48 to produce an augmented wave compression zone 52 which thus has the energy of the receding compression zone 48 augmented by the further energy imparted to it by the impact of the newly generated compression zone 50.

This above described principle of augmentation of a wave, is intended to refer to this process or act of impressing by a single piston or energy input member two energy impulses to the same crest or compression zone of the wave to thereby increase the energy content of the same, and can be applied and used not only in the primary energy input members, but also can be utilized with any energy input member, it being merely requisite to obtain the proper type of piston motion which will enable the piston to reflect or "bounce" an incoming wave, however produced, to obtain a reflected wave therefrom and then overtake and drive this reflected wave in the same cycle of operation and stroke of the piston.

I desire to emphasize at this point that I make use of the rarefaction zone which exists behind the first compression zone or crest 21 of the displacement wave 23 and consequently which is at a momentarily reduced standing pressure, to facilitate the introduction of feed water into the liquid medium. At this point and time of entry, the feed water is not opposed by the standing pressure of the pipes or conduits 10 and 12, due to the momentary region of produced pressure which may even fall below atmospheric pressure depending upon the rate of change of the piston speed as compared with a speed of travel of the displacement wave produced in the displacement portion of the conduit. Consequently, little or no work is required for the introduction of the liquid, and because of the introduction at this particular phase in the compression wave, replenishing or supplemental liquid may be supplied to the medium, or other liquids may be readily introduced into the medium for any desired purpose.

This arrangement also provides a satisfactory means for introducing still further liquid into the elastic medium to thereby increase the standing pressure imposed upon the elastic medium.

By reference to Figure 3, it will be apparent that the introduction of water as mentioned above, provides a convenient means for varying the effective length of the piston rod and of the piston stroke. If no water were introduced by the inlet 44 of Figure 3, the inward margin of the rarefaction would be the piston face in its position 19. Consequently, the piston must then move forward until the dispersed medium particles of the rarefaction zone are compressed to the density of the next adjacent compression zone before the next displacement wave is propagated in the medium. When a charge 46 is introduced however, the charge itself either acts as a forward extension of the piston face (producing a result similar to the actual lengthening of the piston rod); or increases the particle density in the rarefaction zone whereby a lesser piston travel will compress the particles to the particle density of the next adjacent compression zone.

The addition of water will therefore enable the apparatus to vary the characteristics of the wave produced by a piston, or other input member, as to amplitude of displacement, wave length and phase in much the same manner as would an adjustment of the length of the piston rod and/or piston stroke.

It is possible that in some instances I may elect to obtain the opposite effect by withdrawing liquid from in front of the piston to increase the extent of the rarefaction.

At a further position within the displacement portion of the pipe in which the displacement wave exists, means are provided at a location indicated at 120 in the diagrammatic view of Figure 1 for introducing heat into the displacement wave. This location 120 is disposed at one of the rarefactions 35, and preferably in that rarefaction which is in advance or forwardly of the last generated crest or compression 21. Since the rarefaction phase of the displacement wave represent a region wherein the pressure between the molecules or particles of the waves and hence the temperature of that portion of the medium is at a minimum, it is thought that the inflow of heat into the particles and the input of heat energy into the displacement wave may be effected most expeditiously. It is found that the input of heat must be effected by intermittent applications of heat at intervals timed with the existence of rarefaction zones at the heat input station. It is further thought that the introduction of the heat in advance of the last compression crest will prevent the input heat from heating the pistons such as might occur if the heat input was effected at the region of the liquid input from the feed water intake 44.

The timed introduction of the heat input provides a very effective means for increasing the internal energy of the displacement wave and consequently the energy transmitted by the displacement wave at the zero point into the sound wave 29.

Provision is made for the introduction of carbon dioxide or other volatile liquids into the medium for treating the formation, without interfering with the operation of the generator. Thus, at any convenient location beyond the zero point 27, such as that indicated at 122, are provided means whereby carbon dioxide or any other suitable highly volatile liquid, if desired, can be introduced into the liquid medium for treating the oil bearing formation in various ways. By introducing the volatile liquid at this location, under a sufficient pressure to force the same into the liquid despite the standing pressure prevailing in the medium, there is no danger of the introduced fluid expanding into its gaseous stage or condition, such as would occur if it were introduced into liquid medium in the displacement portion at the other side of the zero point. It is found that the introduction of a volatile liquid into the displacement portion of the liquid medium would cause the volatile liquid to intermittently or periodically change from its liquid to its gaseous phase thereby cushioning the impulse and thus tending to detrimentally affect the accurate control of the input of power to be transmitted into the medium beyond the zero point.

Although for simplicity of illustration of the principles of this invention I have shown the impulse members as consisting of a piston driven by a crank, it is understood that the use of other impulse producing members and other actuating means capable of variable speed therefore are comprehended by this invention. In this respect, the hammer valves of the secondary wave generators, to be hereinafter described, are also energy input members and are subject to the above set forth process of augmentation.

It should be noted that my invention in one of its aspects is similar to that set forth in the prior patent of Bodine, Reissue Patent Number 23,381 of June 26, 1951, for Method and Apparatus for Treating Wells, in that it is capable of applying energy to the face of the formation through high frequency sound waves generated in an elastic pressure medium, for thus intermittently raising the pressure to which the formation is subjected; but that my invention differs from that of Bodine, among other features, in that I periodically vary the magnitude of this pressure by combining and/or augmenting compound waves and/or the imposition of hammer shock waves upon the primary wave to thus cause relatively enormous but controllable variations of pressures at the face of the formation.

As mentioned above, the operation of the pistons or other input members is not limited to the crank discs 30 and 32 previously described, and in general I prefer to employ an adjustable crank shaft and connecting rod construction which will produce a varying piston stroke; and which will adjust the length of the connecting rod to produce different speed variations and accelerations of the piston during one reciprocation or cycle of the same.

Figure 18:
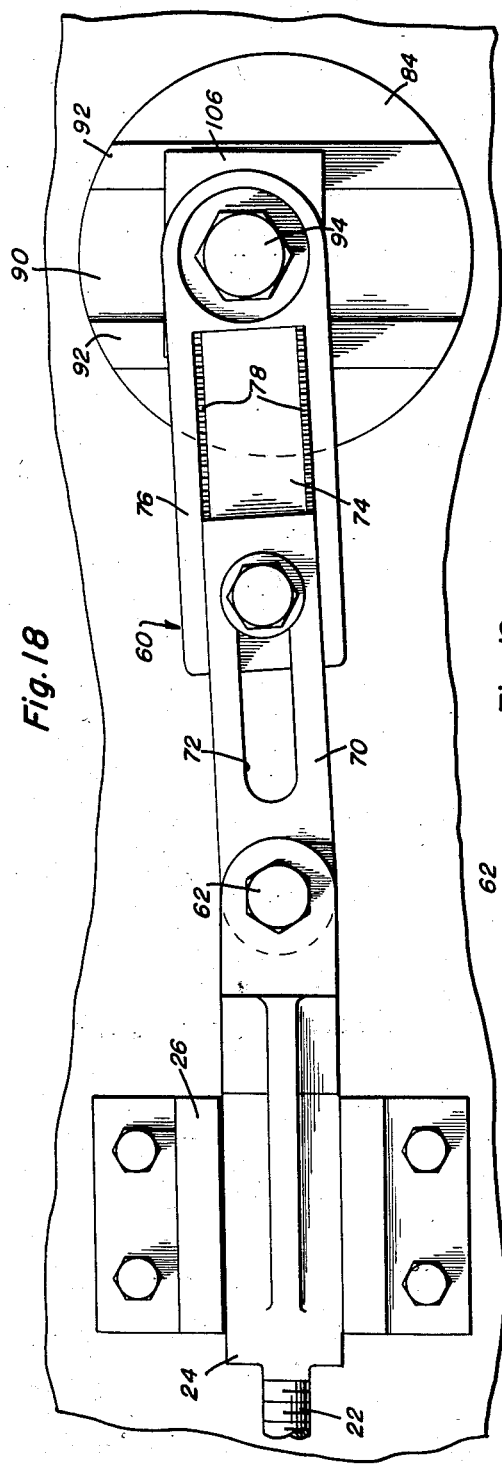
Figure 18 is a fragmentary elevational view similar to Figure 2 of a modified adjustable crank construction and an adjustable connecting rod construction.
Figure 19:
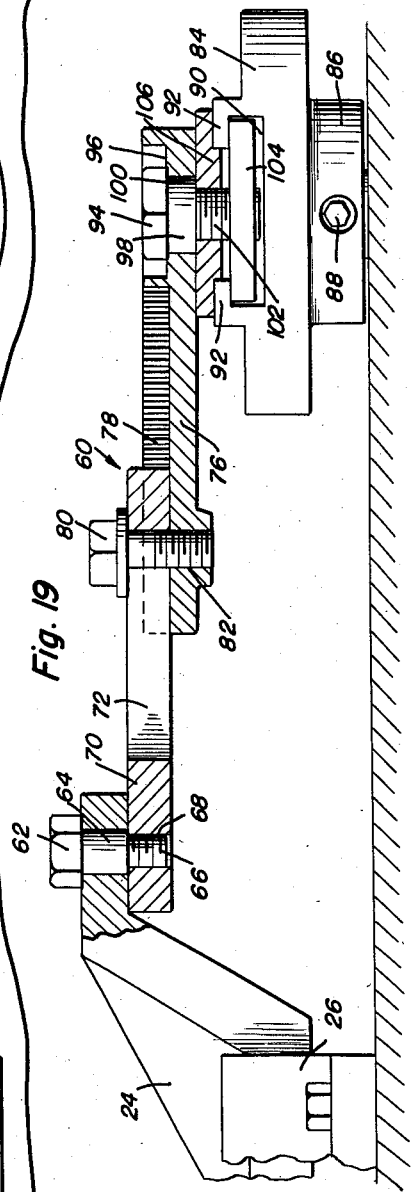
Figure 19 is a bottom plan view of the structure of Figure 18, parts being shown in section.

In this connection, attention is now directed more specifically to Figures 18 and 19. The rear end of the piston rod slide 24 is pivoted to a connecting rod 60, by a pivotal connecting bolt 62 having a cylindrical portion 64 upon which the extremity of the piston rod slide is journaled, and having a screw threaded portion 66 which is engaged in the screw threaded bore 68 at the extremity of an elongated member 70. The latter is provided with a longitudinally extending slot 72, and the member 70 is slidably received in a longitudinal channel 74, provided in one surface of the elongated member 76. If desired, suitable serrations 78 may be provided in the channel 74 to assist in holding the member 70 in longitudinally adjusted position in the channel. To lock the front and rear portions 70 and 76 of the connecting rod in adjusted longitudinally extended positions, a locking bolt 80 extends through the slot 72 and screw threadedly engages in an aperture or bore 82 in the connecting rod member 76. By this construction the length of the connecting rod can be readily varied and the piston positions in the cylinders can be thereby adjusted as desired. The screw threaded extremity of the piston rod 22 can be correspondingly adjusted in the pistons 18 or 20 in order to enable the pistons to be maintained at a desired position in their cylinders 14 and 16 despite different adjusted lengths of the connecting rods and the crank throws which actuate the same, if this is desired.

In place of the crank discs 30 and 32, previously shown and described the crank shafts for the above functions are provided with circular plates 84 having hub portions 86 which are adjustably and removably received upon the crank shafts as by set screws or the like 88. The plates 84 which constitute cheeks of the crank throw of the crank shaft have a diametrically disposed channel 90 across one face of the same, this channel having overlying parallel retaining flanges 92.

A bolt 94 which constitutes the connecting rod journal whereby the connecting rod is operatively connected to the crank shaft cheek has its head portion recessably disposed in a socket 96 in the rear end of the member 76, while upon the cylindrical portion 98 of the bolt is journaled in a bore 100 of the connecting rod member 76.

The screw threaded stem 102 of the bolt 94 extends into the channel 90 and engages the internally threaded bore of a retaining nut in form of a slide 104, this slide engaging the under surfaces of the flanges 92 for movement longitudinally thereof. A pressure plate 106 loosely embraces the threaded portion 102 and is engaged by the lower surface of the cylindrical member 98. By this arrangement the tightening of the bolts 94 will lock the bolt 104 and the pressure plate 106 in adjusted positions in the diametrically disposed channel 90 of the crank shaft 84, whereby the radial distance of the crank throw 98 from the axis of the crank shaft 32 or 34 may be readily varied from a maximum to a minimum to thereby regulate the piston stroke.

*Positively timed water inlet mechanism*

In the apparatus as previously described, it was stated that feed water was drawn from the feed line 44 past a suction operated non-return check valve into the cylinders 14 and 16 upon that portion of the instroke of the plungers 18 and 20 which produced a rarefaction at the inlet port, and that return flow through the inlet port was prevented by the check valve. The difference of pressure which might exist in the liquid supply line upstream from the check valve constituted the motive force for drawing the check valve from its seat to permit such inlet of fluid. While the check valve is very satisfactory to prevent back flow or the transmission of a wave or liquid from the cylinders into the feed line, it is very difficult to obtain a proper and an accurate timing of the opening of the check valve from its seat by the above mentioned pressure difference due to the inertia of the check valve. Accordingly, in some instances it may be found preferable to provide a mechanical means for positively opening the inlet valve at a predetermined and adjustable period in the cycle of operation of the plungers. For this purpose the embodiment which is disclosed in Figures 20–22 is provided.

As shown in Figure 20, there are provided the pistons 18 and 20 together with the piston rods 22, piston rod slides or crossheads 24 and guides 26 in exactly the same manner as that set forth in connection with the first embodiment shown in Figure 2. The same connecting rods 28 or the adjustable embodiment of Figures 18 and 19 are attached to the ends of the piston rod slides 24 by the pivot pin or fastening bolt 29 and in turn are secured by the bolt 40 or 94, previously mentioned, constituting the crank throw in the same manner previously set forth. However, the crank pin or bolt 40 instead of being fastened to the crank disc 30 and 32 in the manner shown in Figure 2, or to the crank plates 84 of Figures 18 and 19, is adjustably secured to the crank disc 352 of a modified construction which is provided with an adjustable valve actuating cam 354 of a modified construction (see Figures 21 and 22) to be described more fully hereinafter.

The feed water valve casing 356 is detachably secured by fastening bolts 358 to a mounting bracket 360 which in return is removably secured by bolts 362 to each of the cylinders 14 and 16. The liquid feed conduit 44 communicates with the valve casing 356 under the control of a check valve 364. The valve 364 may be of any conventional form, such as the poppet valve illustrated, closed by a compression spring 366. The valve is inwardly opened whereby a reduced pressure within the cylinder 14 and 16 will tend to open the valve against the spring, and whereby a rising pressure in the cylinder will close the valve. The valve is positively moved to its open position by a valve actuating lever or rocker 368 which is removably secured to and journaled upon an adjustable supporting bracket 370 as by a bolt 372 constituting a rocker fulcrum. This bracket is preferably provided with an elongated slot 374 which with the fastening bolts 376 provides a means whereby the rocker may be adjusted relatively to the valve of the actuating stem.

At its extremity remote from the valve, the rocker is provided with a bifurcated terminal portion 378 in which is journaled a roller or rollers 380 disposed for engagement by the above mentioned variable cam 354. A compression spring 382, seated between the stationary bracket 384 and bifurcated portion of the rocker urges the valve rocker into contact with the actuating cam. If desired the extremity 378 of the rocker which carries the roller 380 may be constructed for adjustable longitudinal extension.

It will be now apparent that upon rotation of the cam 352 of the two crank shafts, as shown in Figure 20, the check valve 364 will be positively opened in timed relation to the position of the piston, thus overcoming any lag in the opening of the valve which might occur if suction alone were relied upon to actuate the same.

The variable cam construction 352 previously mentioned is shown more clearly in Figure 21 and 22. The crank disc valve cam 352 is provided upon its opposite faces with arcuately extending recesses 386 and 388, respectively, for circumferentially sliding movement therein. Each of these segments is provided with a radially projecting and circumferentially extending portion 394 and 396 which together form the lobe of the cam. The segments are provided with arcuately extending slots 398 and 400 through which is mounted a fastening bolt 402 which also extends through the intermediate portion of the cam disc 352 between the recesses 386, 388 as shown in Figure 22. By this means, the two cam segments can be moved circumferentially towards or from each other whereby their lobes 394 and 396 will circumferentially overlap each other by variable amounts to thereby provide a cam having a variable leading edge, a trailing edge, and a duration. The segment portion 396 constitutes the leading lobe, having a leading edge 404 and a trailing edge 406, while the segment portion 394 constitutes the trailing segment of the cam having leading edge 408 and a trailing edge 410. It is obvious that these cam segments may be moved closely together so that their leading edges and trailing edges coincide, at which time the minimum duration of the cam actuation is obtained.

In this position of the cam segments, it is obvious that the cam 354 can be moved circumferentially of the crank disc 352 to vary the timing of the same. Alternatively, either segment may be moved to the position of maximum duration of operation of the cam, at which time either the beginning of the operation of the cam, the ending of the operation of the cam, or both may be adjusted.

It is thus apparent that the variable cam provides a ready means for accurately and precisely opening the water inlet port at any desired period in the cycle of operation of the pistons 14 and 16, this despite all changes in the phase relationship of these pistons. By this means, liquid or fluids may be added to or received from the conduits at adjustably controlled times and in adjustably controlled quantities.

*Secondary or hammer shock wave generators*

Reduced to its barest essentials, the hammer shock generator, which is the secondary wave generator previously mentioned, includes a conduit for discharging the liquid from each of the pipes 10 and 12; a hammer valve assembly for each such conduit to suddenly stop the liquid discharge and thereby produce a hammer shock vibration in the pipes 10 and 12; two sets of hammer valve actuators for producing periodic, independently and adjustably timed, operation of each hammer valve assembly; and associated hydraulic conduit connecting means between the actuators and the valves.

The two sets of hammer valve actuators comprise a basic or primary set of piston and cam units, one for each hammer valve assembly and which operate at a 1:1 ratio with respect to the piston 18 and 20 and a second or auxiliary set of piston and cam units. This second set, consists of two groups of piston and cam units, each group having its members operable simultaneously with the basic or primary set of members but at variably controlled intervals.

In order to avoid confusion in the ensuing portion of the specification, the following nomenclature will be employed. The assemblies 134 and 136 are hereinafter termed hammer valves or hammer valve assemblies. The valve actuator assemblies 236 and 240, when rendered effective, operate at a 1:1 ratio with respect to the operation of the pistons 18 and 20 and respectively actuate the hammer valve assemblies 134 and 136, and are accordingly identified as the constant ratio hammer valve actuators or the constant ratio actuators 236 and 240. The piston and cam units 284 which are operated by the cam 280 and those which are operated by the cam 282 and which also when rendered operative, respectively actuate the hammer valve assemblies 134 and 136, are identified hereinafter as the variable ratio hammer valve actuators or the variable ratio actuator.

Reference is now made to Figure 1, 12 14–17 for a detailed consideration of the structure and operation of the hammer shock generator. One or more of the discharge pipes 130 and of the discharge pipes 132 are connected respectively with the inside pipe 12 and with the outside pipe 10, only one each of the discharge pipes 130 and 132 being illustrated in order to simplify the illustrations and descriptions. Controlling flow through the discharge pipes 130 and 132 are hammer valve assemblies 134 and 136 respectively, of identical structure and operation. Consequently, the showing in Figure 14 of the hammer valve assembly 134 and a description of the same, will suffice for both.

The extremities of the pipes 130 and 132 screw threadedly receive flanged coupling members 138, to the flanges 140 of which are removably secured by bolts 142 intermediate plates 144 having chambers 146 therein forming smooth continuations of the internal surfaces of the conduits 130 or 132. The flanged portions 150 of casings 152 are detachably secured by bolts 148 to the plates 144, and thus, to the ends of the conduits. Each casing 152 has a substantially cylindrical interior which is closed at its outer end by a removable cap member 154 secured by bolts 156. The other end of the casing 152 has an integral end portion 158 extending thereacross, which has a chambered portion 160 forming an end continuation of the curving side wall of the chamber 146 of the plate 144, this chambered portion having a centrally disposed bore or passage 162 communicating therewith and extending into the interior of the casing 152.

Adjacent the bore 162 and in the interior of the casing 152, a valve guide member 156 having an axial valve guide bore 166 therethrough is secured to the wall of the internal chamber of the casing 152 by a spider or cross arms 168. A hammer valve 170 which may be of the poppet valve type, has a stem 172 with a compression type of valve spring 174, retained between the valve spring retainer 176 mounted upon the valve stem and an adjustable valve spring seat member 178, in the form of a nut, which is adjustable upon the externally threaded portion 180 or the valve stem guide 164.

By means of a suitably positioned aperture and closure for the same, not shown, extending through the wall of the casing 152, access may be had to the interior to insert a tool for rotating the member 178 and adjust the closing force exerted by the spring 174 upon the hammer valve 170.

It will be noted that the head of the hammer valve engages the narrow or reduced portion of the recess 160 which constitutes a valve seat for the same, whereby the valve controls flow of fluid from the conduits 130 or 132 to the interior of the casing 152, this fluid then passing the valve guide supporting spider 168 and discharging through waste pipes 182 to any desired place of disposal of the discharged fluid.

The valve casings 152 are removably secured by bolts 188 to supporting flanges 184 of mounting or support plates 186 which are suitably secured by fastening bolts 190. At their opposite sides, the valve casings 152 are also releasably secured by bolts 192 to mounting flanges 194 of mounting plates 196 which in turn are secured by mounting bolts 198.

It will thus be seen that each of the valve assemblies 134 and 136 is removable as a unit from its detachable connection with the mounting plates and from its detachable connection with the intermediate plates 144 which are secured to the ends of the conduits 10 and 12.

These hammer valves, when open, permit the flow of liquid from the transmitting medium and from the pipes 10 and 12, through the discharge pipes 130 and 132 until a certain momentum of flow has been built up in this moving liquid. When the valves 134 and 136 are then suddenly closed, the inertia or ram effect produced by the sudden halting of these moving columns of liquid produces a very intense hammer shock therein. By means of the constant ratio actuators and the variable ratio actuators to be now set forth, the hammer valves 134 and 136 are variably timed with respect to each other and also with respect to the primary wave, previously mentioned, so as to produce a reinforcement of the latter.

Figure 14:
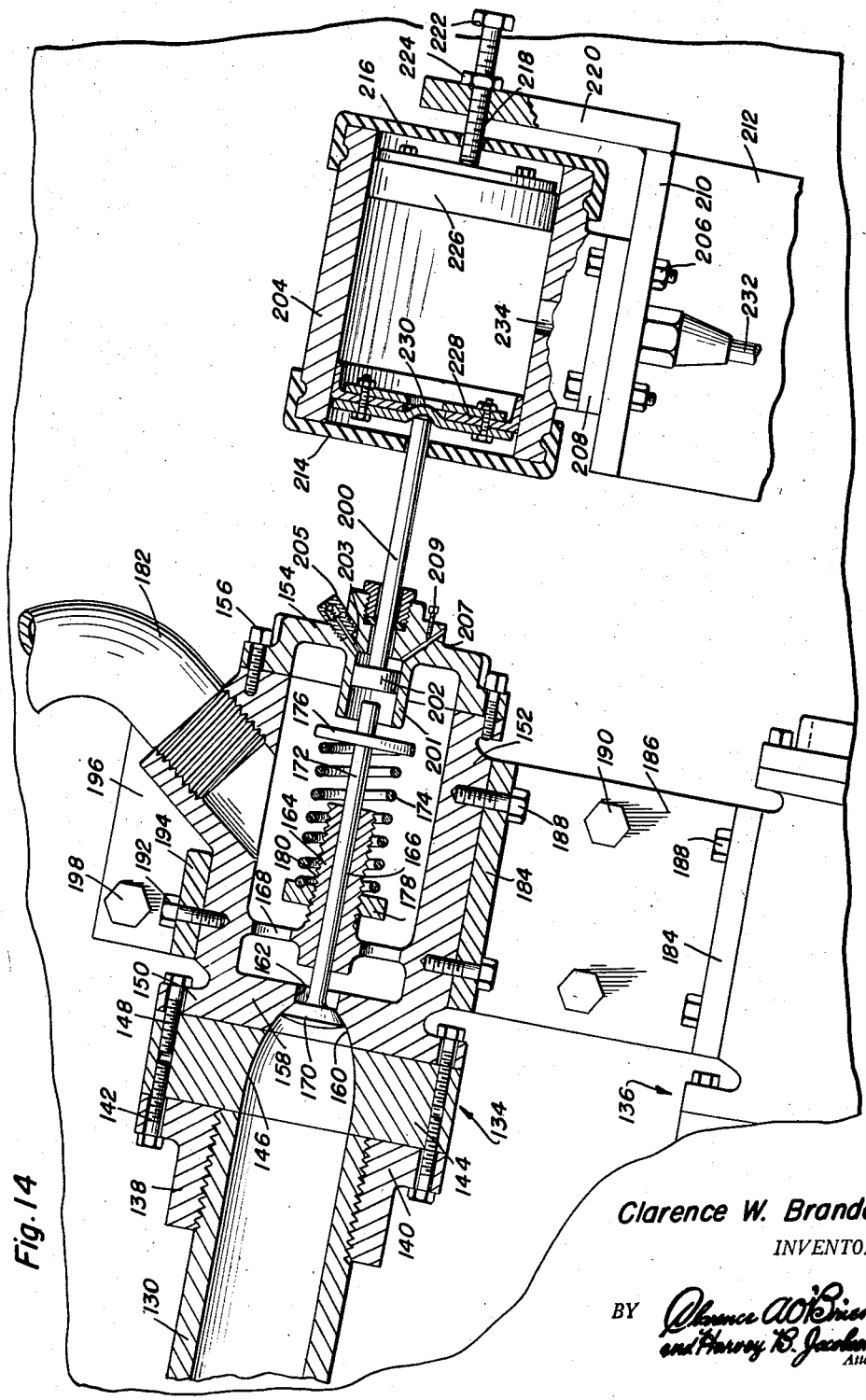
Figure 14 is an enlarged sectional view of one of the secondary wave hammer valve units constituting an energy wave power input means.

Means are provided for periodically opening the spring closed hammer valves 170 of the hammer valve assemblies, as shown in Figure 14. This means includes a plunger 200 which is slidable through a bore in the closure plate 154 and is provided with a head 202 which is adapted to abut against the valve stem and actuate the valve stem and piston against the bias of the valve closing spring 174.

A regulatable dashpot is provided for controlling the rate or speed of the closing movement of the hammer.

valve 170. While numerous dashpot structures and arrangements may be satisfactorily employed for the purpose, I prefer that of Figure 14. The end closure plate 154, upon its inside surface has a tubular extension or sleeve 201 which is open at its inside end and which surrounds and slidably receives the plunger head 202 which thus constitutes the dashpot piston.

A vent 203 extends through the cover plate 154 and is provided with a non-return air inlet check valve 205 to admit air behind the dashpot piston. An air outlet passage 207 has an adjusting valve 209 in the form of a screw to regulate the rate of escape of air from the dashpot and thereby the closing speed of the hammer valve 170.

By the above means, it will be evident that the hammer valve closing speed can be adjustably reduced to any desired speed less than that which would be permitted by the operator cylinder 204.

To operate the plunger 200, there is provided a cylinder 204, mounted by bolts 206 and flange 208 to a mounting flange 210 on a support bracket 212. The ends of the cylinder 204 have screw threaded closure plates, 214 through which the plunger 200 extends, and 216 through which extends an adjusting screw 218. The latter extends through a support arm 220 on the flange 210, and has a manipulating finger grip portion 222, a lock nut 224 maintaining the screw in adjusted position.

The screw engages and actuates an adjusting piston 226 for varying the volume of the cylinder 204. An actuated plunger 228 is slidable in the other end of the cylinder and has a centrally depressed portion 230 for receiving the end of the plunger 200. Hydraulic fluid is supplied from the constant ratio valve actuator 236 to be subsequently described, through a conduit 232 and a port 234 to the interior of the cylinder 204, for actuating the plunger 220 and the hammer valve 170. A similar conduit 238 connects the cylinder 204 of the hammer valve 136 to its valve actuator 240.

The adjusting plunger 226 enables the slack or lost motion of the system to be reduced or increased as desired to selectively render the hammer valves operable or inoperable by the hydraulic actuating means to be subsequently described, to variably control the extent of opening of the hammer valves by controlling this lost motion or even to manually open the hammer valves for bleeding the pipes 10 and 12 as desired.

Periodic, timed, impulses, delivered to the plunger 228 of the cylinders 204 through the conduits 232 and 238 by the constant ratio valve actuators open and hold open the hammer valves.

When the hydraulic pressure upon the hammer valve 170 is released the pressure of the moving liquid together with that of the spring 174 will abruptly close the hammer valve. The sudden cessation of flow, because of the inertia or ram effect of the column of liquid produces a very intense hammer shock in the liquid column. By properly timing the moment of closing the hammer valve assemblies 134 or 136 with respect to the position of input members or pistons 18 and 20, and therefore with respect to the phase of the resultant primary wave, a reinforcement of adjustable strength of the latter may be obtained.

As set forth in my above identified prior co-pending application, the intense amplitude and the sharp timing of the hammer shock, when intermittently applied to the periodic pressure vibrations of the primary wave, produces a very disruptive effect upon the oil formation, thereby facilitating the recovery of oil therefrom.

The hammer shock or secondary wave generators of the present apparatus thus provide means for conveniently and accurately producing a number of secondary or hammer waves; and for combining and/or augmenting these secondary waves in the manner previously set forth, to obtain desired resultant secondary waves having predetermined characteristics.

Figure 15:
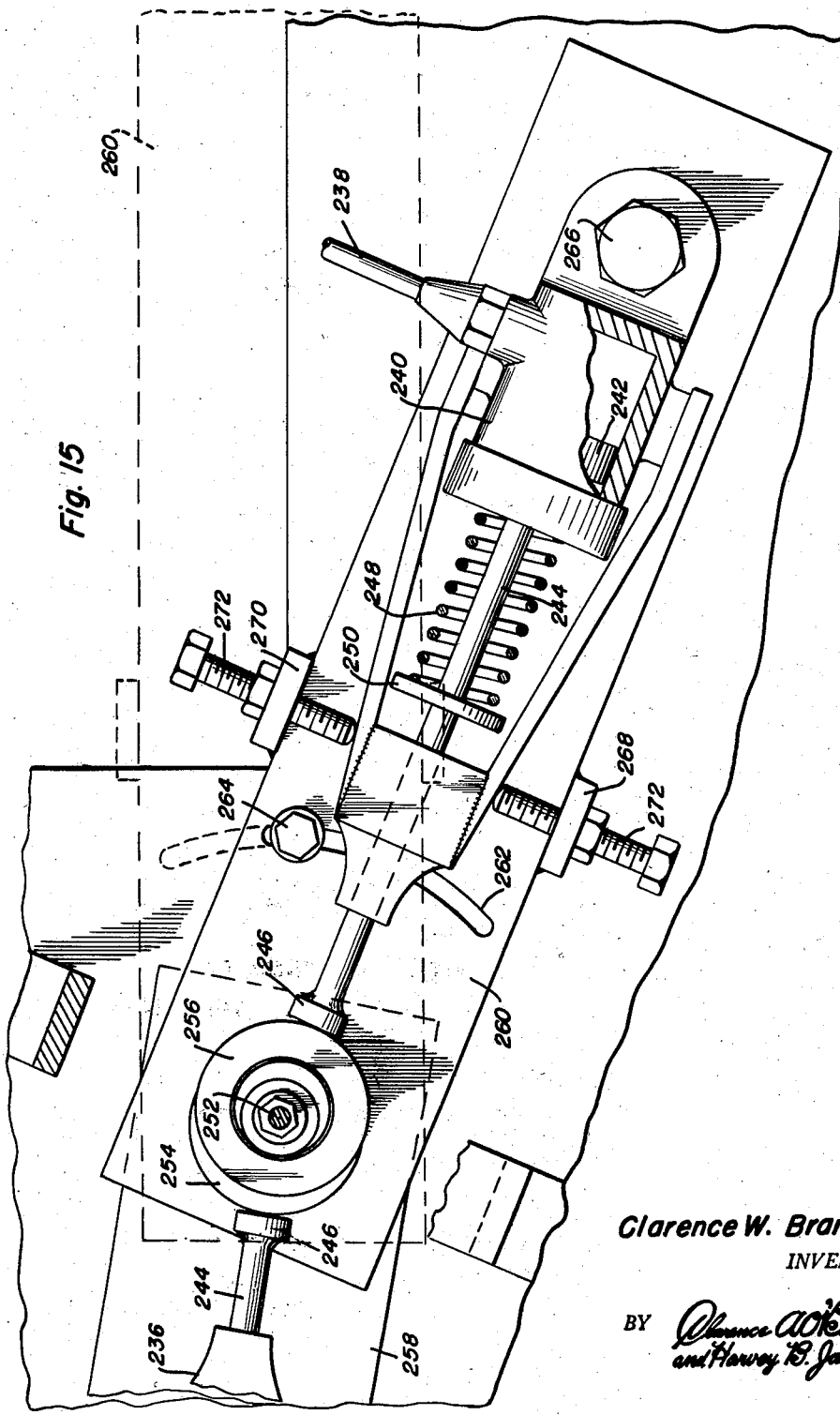
Figure 15 is an enlarged sectional view of one of the constant ratio hammer valve actuating units, an alternative position of adjustment of one of the actuating units being shown in dotted lines therein.

The constant ratio valve actuators 236 and 240 are angularly adjustable relative to each other, and/or to their driving means as will be more readily apparent from Figures 12 and 15; and since the construction of the actuators 236 and 240 are identical, the description and the illustrations of the construction of one, will be sufficient to understand the structure and operation of both.

As shown more clearly in Figure 15, the constant ratio valve actuator 240 includes a piston 242 reciprocably mounted in a cylinder and having a piston rod 244 extending from the cylinder and provided with a cam engaging foot 246. A compression spring 248 is compressed between the cylinder and a spring retainer 250 upon the piston rod 244, biasing the piston 242 outwardly of its cylinder and towards the piston actuating means. The latter comprises a cam shaft 252 operated at the same speed as the crank discs 30, 32 and having a pair of cams 254 and 256 adjustably secured thereon in side by side relations. The cam 254 actuates the piston of the valve actuator 240 while the cam 256 actuates the piston of the actuator 236. The time of operation of the pistons 242 can be independently adjusted by shifting the cams 254 and/or 256 upon the cam shaft 252, thus varying the time of the actuation of the hammer valves with respect to each other and with respect to the phase of the primary wave produced by energy input members 18 and 20.

It is also possible to vary the phase relationship between the two pistons 242 by adjustably and independently pivoting the actuators 236 and 240 about the cam shaft 252.

For this purpose, the constant ratio actuators 236 and 240 are mounted upon plates or other suitable adjustable support members 258 and 260 respectively. The plates are pivoted in side by side positions upon the cam shaft 252, the cylinders being adjustably pivotably secured upon the plates by bolts 264 at one end of the cylinders, and the plates have arcuate slots 262, receiving locking bolts 264 which ride in these slots but are secured to a suitable portion of the supporting frame of the apparatus. Thus, the plates and the cylinders carried thereby can be angularly adjusted with respect to each other and locked in this desired position of adjustment by the fastening bolts 264.

The cylinders in turn are independently pivotally adjustable upon their respective supporting plates by the above mentioned fastening bolts 266 at one end of the cylinders. The other end of the cylinders are disposed between pairs of upstanding arms 268 and 270 secured to opposite sides of the plates 258 and 260. Adjusting bolts 272 extend through these arms and engage the sides of the cylinders for positioning and securing the cylinders in pivotally adjusted positions about their bolts 266. Proper manipulation of bolts 272 enables any selected cylinder to move into radial alignment with the axis of the cam shaft 252 whereby the maximum stroke of the cam is imparted thereto; or to be moved selectively away from the cam to lessen the stroke imparted thereby; and even to move the cylinder entirely out of engagement with the cam and to an inoperative position. By this pivotal adjustment, the time and extent of actuation of the pistons 242 of each constant ratio valve actuator 236 and 250 may be independently adjusted.

By virtue of the constant one to one speed ratio of the pistons 18 and 20 with the actuator pistons 242, and of the previously mentioned various adjustments of the valve actuating pistons 242, hammer valve wave impulses may be conveniently and accurately produced and may be combined with the primary waves to produce resultant waves or may be augmented for that purpose as described hereinbefore. It is thus possible to obtain a hammer wave in adjustably timed, synchronized relation with any of the primary component waves or with the resultant primary wave.

The constant ratio hammer valve actuators 236 and 240 previously described are capable of producing timed hammer valve actuating impulses at a 1:1 ratio to the operation of the piston 18 and 20, and are termed constant ratio hammer valve actuators. While in some instances the continuous generation of the secondary wave consisting of a hammer shock for each of the component waves of the primary wave may be deemed to be satisfactory, their generation will be generally preferable at periodic intervals during the operation of the primary wave pistons, and at an adjusted phase relationship with respect thereto, and at predetermined but variable intervals. Thus, I have found it desirable to be able to cause a period of operation of the hammer valves in integer multiple frequencies such as once for every 12 revolutions of the crank shaft 34 and 36; or upon every 144 revolutions thereof; or upon every 1,728 revolutions. It is of course understood that the principles of the invention are not limited to these particular ratios of operation, but that any other desirable ratios found to be expedient could be utilized.

For obtaining this desired variable ratio actuation of the hammer valves, a mechanism shown in Figures 1, 12, 16 and 17 has proven satisfactory. This mechanism comprises a plurality of parallel cam shafts 274, 276 and 278 appropriately geared to each other and to the cam shaft 252, as set forth hereinafter, to have the desired speed ratio. Each of these cam shafts is provided with a pair of actuating cams 280 and 282 disposed thereon in angularly adjustable side by side relation. The angular relationship of the cams in each pair will generally be the same, although each cam could be independently adjustable if desired, and will also be substantially the same as the angular relationship between the cams 254 and 256.

A cylinder and piston unit is operatively connected to each of the cams 280 and 282, but since the construction of the cylinder and piston units is identical, the same numerals will be considered as applied to each of the units. Each variable ratio actuator 284 thus includes a cylinder with a piston 286 reciprocable therein and having a rigid piston rod 288 engageable with the corresponding actuating cams 280 or 282. A stop collar 289 is suitably secured to each piston rod 288 for abutting engagement with the guide block 329 to limit movement of the piston towards the cams 280 and 282, and thus prevent ejection of the pistons from their cylinders 284 by the constant ratio actuator pistons 242 or the pressure in the associated conduits.

Each of the three cylinders of the variable ratio actuators 284 associated with the cams 280 of the cam shafts 274, 276 and 278, see Figure 1, comprise a group of units which is connected by branch conduits 290 to a hydraulic line 292 communicating with the hydraulic actuating line 238 which connects the hammer valve assembly 136 with the constant ratio hammer valve actuating line 238 which connects the hammer valve assembly 136 with the constant ratio hammer valve actuator 240. In a similar manner, each of the three cylinders of the variable ratio actuators 284 associated with the cams 282 of the cam shafts 274, 276 and 278 comprise a second group of units which is connected by branch conduits 290 to the conduit 294 communicating with the hydraulic line 232 connecting the constant ratio hammer valve actuator 236 with the hammer valve assembly 134.

The variable ratio actuators 284 of each set during the period when their pistons 286 are moved to their outstroke by their associated cams 280 or 282, force enough hydraulic fluid into the associated conduits 232 or 238 to take up all lost motion in the same so that the constant ratio pistons 242 will now be effective to operate the associated hammer valve assemblies 134 and 136. It may therefore be considered that the variable ratio actuators 284 serve to time or pre-conditions the hydraulic mechanism so that for a predetermined, fixed duration of time, at variable intervals in the continuous operation of the apparatus, constant ratio pistons 242 of the two units 236 and 240 are rendered effective to actuate the hammer valves in 1:1 relation in synchronization with the actuation of input members 18 and 19.

Thus, when the cams 280 and 282 of the cam shaft 278 are rendered effective, the hydraulic actuating conduit 232 will be rendered operative once for every 12 revolutions of the crank shafts 34 and 36, and during that period of operation the cam shaft 252 will through the cams 254, 256 actuate each of the hammer valves 134, 136, once for each actuation of the pistons 18 and 20. Similarly when the cam shaft 276 is rendered effective, the hammer valves will be operated during periods occurring only once in each 144 revolutions of the crank shafts 34 and 36, and similarly when the cam shaft 274 is rendered effective, this operation will be effected during periods occurring only once in every 1,728 revolutions.

It will also be apparent that instead of causing the actuation of the variable ratio pistons by the cam shafts 278, 276 or 274 singly, I may operate these in various combinations with each other thus producing various timed spacings and durations of operation of the variable ratio actuators of the secondary input members.

It will also be apparent that it is possible to actuate one or both of the members 236 and 240 continuously, at a constant one to one ratio to the pistons 18 and 20 and at varying portions of their maximum amplitude of stroke or capacity, while also providing additional secondary impulses by operation of one or more of the variable ratio hammer valve actuating members 284.

In general, however, the variable ratio units 284 will be employed to control the period at which the constant ratio units 236 and 240 are rendered capable of operation.

Figure 16:
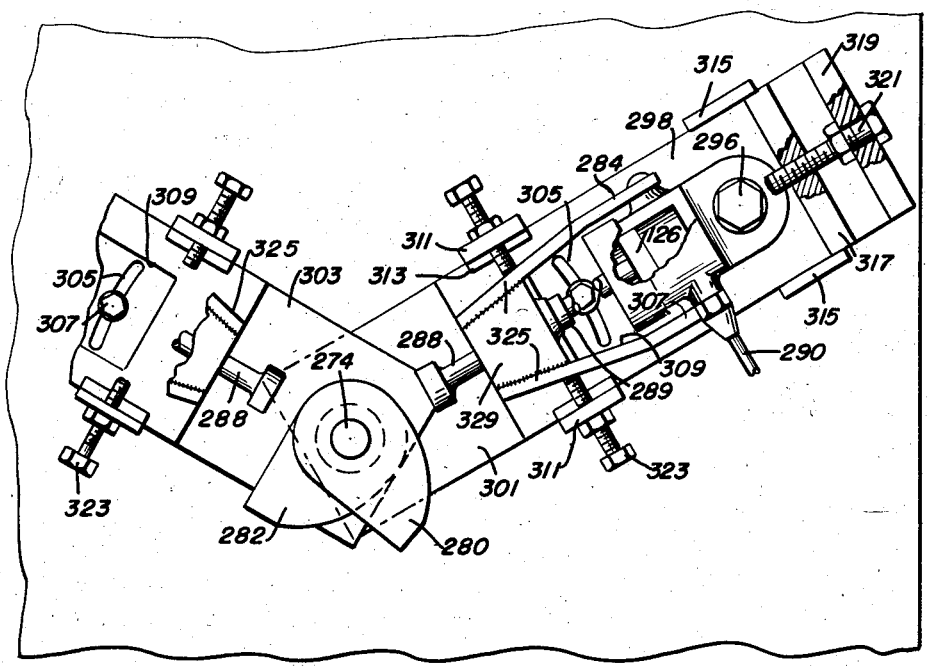
Figure 16 is an enlarged sectional view of one of the variable ratio hammer valve actuating units.
Figure 17:
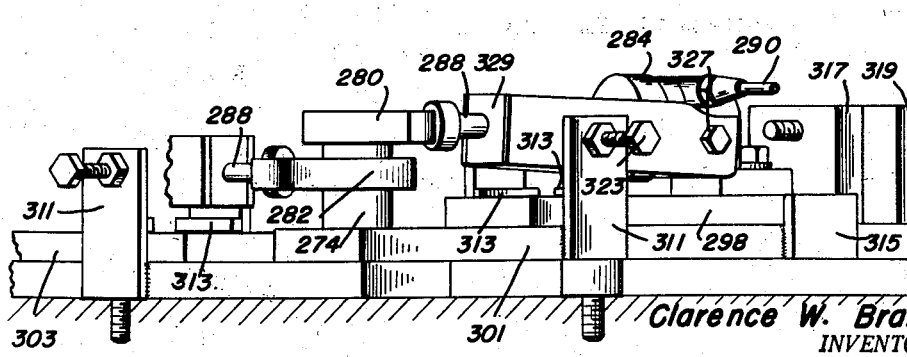
Figure 17 is a bottom plan view of the assembly shown in Figure 16; parts being broken away and omitted.

The variable ratio hammer valve actuating units 284 are preferably of a slightly different construction from that of the constant ratio hammer valve actuating units 236 and 240. As shown in Figures 16 and 17, the units 284 which are actuated by the cams 280 are pivotally secured at one end by a fastening bolt 296 upon a flat slide 298 which rests upon and is guided for movement upon a flat elongated mounting plate 301. A similar plate 303 carries by identically the same construction, the unit 284 which is associated with the cam 282.

The plates 301 and 303 are pivotally mounted upon the cam shafts 274, 276 and 278 as will be seen in Figures 12, 16 and 17 and are secured in adjusted position about the axis of the associated cam shaft by means of an arcuate slot 305 extending through the plates 301 and 303 and a fastening bolt 307 which extends through the slot to releasably clamp the plates 301 and 303 in fixed adjusted position against a suitable stationary support surface. It should be noted, especially from Figure 12, that the slide 298 has a rectangular cut away portion 309 which provides clearance for the fastening bolt 307 during longitudinal movement of the slide and pivotal movement of the plates 301, 303 and affords access to the bolt.

Upon their opposite sides, and adjacent that end of the plate which is pivoted to the cam shaft, there are provided upstanding lugs 311 having inturned flanges 313 overlying the top surface of the slides, the flanges retaining the slides downwardly upon the plates and the lugs 311 preventing lateral displacement of the slides with reference to the plates.

Adjacent their other ends, the plates are provided with another pair of upstanding guides lugs 315 which serve to further guide the slide 298 in its sliding motion.

At its outer extremity, the slide is provided with an upstanding flange 317 and a similar and parallel upstanding flange 319 rises from the outer end of the plates 301 and 303. An adjusting bolt 321 is rotatively journaled in the flange 319, and has its shank screw threadedly engaged in the flange 317 whereby upon rotation of the bolt, the slide will be moved longitudinally of the plate towards and from the cam 280 or 282.

Extending through the lug 311 are transversely aligned adjusting bolts 323 which are adapted to abut and engage a pair of flat arms 325 which at one end are secured as by bolts 327 to the cylinder member of the actuator 284, and at the other ends are welded or otherwise rigidly attached to a block 329.

The piston rods 288 of the pistons 286 extend through guides bores in the blocks 329, and are thus engageable by one of the cams 280 or 282.

It is thus evident that each of the variable ratio hammer valve actuators 284 are capable of a variety of independent adjustments. Thus, the entire unit may be pivoted about the axis of the cam shaft with which it is associated to thus vary the angular phase relationship between the pair of variable ratio actuator units attached to each cam shaft and which time the actuation of the two hammer valve assemblies 134 and 136. In addition, the units 284 may be moved towards or from the cam to thereby vary the amplitude of stroke imparted to the plungers 286, thereby vary the amount of opening of the hammer valves from zero to maximum. Finally, each unit may be pivoted about its fastening bolt 296 to thus advance or retard the time at which the rod 288 is actuated by its associated cam. Any and all of these adjustments may be effected simultaneously or independently.

The lateral displacement of any of the constant ratio actuators 236 and 249 and/or of the variable ratio actuators 284 from radial alignment with their actuating cams will vary the speed and duration of the actuator pistons instrokes relative to their outstrokes, in accordance with well understood mechanical principles. I make use of this for a number of purposes.

By laterally shifting the actuators to obtain a faster hammer valve opening and a slower hammer valve closing, the magnitude of the hammer shock may be reduced or cushioned to any desired extent. This type of operation is particularly advantageous where treating relatively soft and crumbling formations and where it is important to avoid danger of collapsing the formation. Also, the slowing of the closing movement of the hammer valve will keep the latter open for a greater part of the duration of its movement, enabling the flow of liquid therethrough to cleanse the valve seat of any foreign matter which might oppose the proper seating of the valve.

By the converse operation, the slower opening and faster closing of the hammer valve will obtain a greater hammer shock which is especially desirable for crushing hard formations.

By periodically, at predetermined controllable intervals, causing a larger opening of the hammer valve, flow of larger particles of foreign matter through the valves is permitted, but without effecting a substantial pressure or fluid loss of the medium controlled by the valves.

It should be noted also that the same provision may be made for the introduction of liquid $CO_2$ or other highly volatile liquids, or for the input of heat at each of the hammer valve actuating pistons 242 or 286 as was provided for the primary wave pistons as hereinbefore set forth.

While the above described hydraulic mechanism has been found to be satisfactory for operating the apparatus herein described, the principles of this invention are not limited thereto and I desire to be definitely understood that various other operating mechanisms may be employed as desired, including conventional mechanical valve actuating mechanisms, electric actuating mechanism and the like; while mechanized or other connecting means may be utilized between the constant ratio actuators and the variable ratio actuators and the hammer valve assemblies.

*Driving and timing means for the primary wave generators*

As shown in Figure 13, my wave generating apparatus can be powered by a single compact prime mover or power plant 300 of any desired character, and which may consist of an electric motor, gasoline engine or the like, and which is suitably mounted adjacent a supporting frame work or casing 302 which supports and houses various elements of this apparatus. The prime mover is of any type whose speed of rotation may be accurately and readily controlled and varied and is provided with a power shaft 304 which is connected or coupled by any suitable coupling 306 to the crank shaft 36.

The crank shafts 34 and 36 are disposed in parallel relation and are vertically spaced, being journaled at one end in journal bearings 308 detachably secured to the inside surface of a vertical wall 310 forming one side of the supporting frame 302. The other ends of the crank shafts are journaled in bearings 312 and 314 which are supported by the other vertical wall or plate 316 of the supporting frame work.

It will be noted that the crank shaft 36 is directly connected to the powershaft 304 for rotation thereby, and has a gear 318 secured thereto which engages a gear 322, see Figure 2, through a suitable idler gear 320. The gears 318, 320, and 322 are of the same diameter and number of teeth, whereby the gears 318 and 322 travel at the same speed and in the same direction. The gear 322 is secured by a sleeve 324 which surrounds and journals the opposite end of the crank shaft 34 from that which carries the crank disc 30, the sleeve in turn being journaled in the above mentioned journal bearing 308. It is thus seen that driving motion is imparted from the crank shaft 36 to this sleeve 324. Fixedly secured to the outer end of the crank shaft 34 is a disc 326 which engages a complementary clutch disc 328 which is integral with the sleeve 324. Fastening bolts 330 screw threadedly engage flange or disc 328, and extend through arcuate slots 332 formed in the disc 326. By this means, discs 326 and 328 may be rotated with respect to each other whereby to vary the timing between the sleeve 324 and the crank shaft 34, and therefore the timing between the two crank discs 30 and 32. This construction permits the previously mentioned change in phase relation between the two energy input members 18 and 20 and therefore enables the obtaining of any desired phase relation between the basic and auxiliary component waves whose resultant constitutes the previously mentioned primary wave. Obviously any other type of means for varying the angular relation of the shafts 34 and 36 may be utilized.

A still further gearing assembly, of a known and conventional type, not shown, drives the constant speed ratio hammer valve actuators from the gear 320, while a second gearing assembly, also of any conventional type, not shown, drives the variable ratio hammer valve actuators from a gear 334 fixed to the crank shaft 34.

I contemplate employing any of the timed shafts of this apparatus, and especially one of the variable ratio hammer valve actuating camshafts 274, 276 or 278, but preferably the 1:12 ratio shaft 274 to drive any suitable timing indicator, whereby travel of a selected hammer shock wave through the formation can be accurately timed.

*Uses and advantages and modes of application*

In addition to its very important function of treating oil bearing formations in wells and oil fields and the like, the principles of this invention and the forms of apparatus hereinbefore described are capable of other diversified functions and advantages. For a more complete understanding of the exact manner in which the apparatus of the present invention facilitates the recovery of oil from oil bearing formations, attention is directed to my above identified prior co-pending application.

In addition to its use in recovering oil from formations and wells, it is useful in the treating of wells and the like to determine the type of treatment necessary for the maximum recovery of oil from a formation, and in the case of core samples for determining the percentage of the potential oil which may be recovered by the apparatus and method of this invention. Thus, tests can be made upon cores for ascertaining the exact treatment calculated to obtain the maximum yield or recovery of oil from the formation, and the corresponding operation of the apparatus upon a formation may be determined in advance without running the risk of a possible detrimental effect upon the formation which experimentation thereon might produce.

It is also possible to greatly extend the effective scope of operation of this apparatus by simultaneously employing a plurality of the apparatuses, each at a well bore to accurately control the treating operations by reinforcing and combining the waves of the different apparatuses, as suggested in my above identified prior co-pending application.

In addition to its main primary function of applying controlled pressures and shock waves of varying magnitude to formations, my apparatus and method afford a highly efficient and very adaptable means for applying heat to a formation to lower the viscosity of the oil therein and thus facilitate cleansing of the formation and recovery of oil therefrom. The introduction of sensible heat into the transmitting medium, and into that portion of the same which carries the compression wave of the apparatus permits the maximum rate of inflow of heat into the medium because of the greater temperature range existing between the heat and its place of input and the relatively low temperature of the rare faction portion of the compression wave. This inflow of heat energy thus increases the energy content of the compression wave, thereby enhancing the impact or blow of the compression wave at the zero point of the elastic medium, and thereby causing the maximum energy input to the relatively stationary or non-moving portion of the medium, and thereby producing a sound wave of the maximum energy content which in turn will develop or deliver the maximum heat energy upon its impact with the formation or any other heat receiving medium which is in contact with the elastic transmitting medium.

My particular arrangement for the input of heat is particularly effective in that it insures the flow of heat outwardly from the input member or pump piston and thereby avoids danger of heating or overheating the latter. In actual operation, the pump piston will remain cool, while that portion of the conduit immediately adjacent and outwardly of the point of application of heat will reach an appreciably higher temperature. It is thought that the input of heat at a location where that is a compression wave formed between the location of input of heat energy and the face of the piston prevents the relative flow of heat towards the piston.

The present apparatus and method of operation of the same provide an extremely satisfactory manner of introducing highly volatile liquids into the elastic medium, such as carbon dioxide or the like, which are commonly employed for treating oil bearing formations and increasing the recovery of oil therefrom. This invention not only facilitates the introduction of such materials into the elastic medium, but also facilitates their dispersal throughout the particles of the medium and their application to the face of the oil bearing formation.

The invention also provides an extremely efficient apparatus and method for blending different fluids, in view of the highly effective dispersal of the particles on one fluid within the other by the vibration and agitation given to the particles.

The apparatus is also useful in increasing the speed and efficiency of any catalytic reactions since its highly efficient manner of dispersing a catalyst throughout a medium is calculated to increase the effective surface contact of the catalyst and the medium.

This same property of securing a more rapid and more complete intermingling of the molecules of one fluid medium with another will likewise enhance both the speed and efficiency of fractionating processes.

The invention is still further useful for drilling and pumping operations since it will obtain a more complete dispersal of the particles of drilling mud throughout the liquid and facilitate the removal of cuttings from the well bore by maintaining through its vibrations and agitation a more complete suspension of the solid particles in the liquid medium.

From the foregoing, the construction and operation of the device will be readily understood and further explanation is believed to be unnecessary.

However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A generator of high frequency energy transmitting waves in an elastic wave transmitting medium, comprising a basic energy input member having operative contact with the medium, a first driving means for imparting periodic motion to said basic input member, an auxiliary energy input member having contact with the medium, a second driving means for imparting periodic motion to said auxiliary input member, means connecting said first and second driving means in adjustable, timed relation, said first driving means causing said basic input member to produce in said medium a periodic incident wave and a succeeding periodic reflected wave, means for variably timing said driving means to cause said reflected wave to contact said basic input member in adjustable out of phase relation to the incident wave whereby a resultant incident wave will be generated which is augmented relative to the reflected wave.

2. A generator of high frequency energy transmitting waves in an elastic wave transmitting medium, consisting of a basic energy input member having operative contact with the medium a first driving means for imparting periodic motion to said basic input member, an auxiliary energy input member having contact with the medium, a second driving means for imparting periodic motion to said auxiliary input member, means connecting said first and second driving means in adjustable, timed relation, said driving means causing each input member to produce in said medium a periodic incident wave and a succeeding periodic reflected wave, means for variably timing each driving means to cause the reflected waves to contact the input members in adjustable out of phase relation to the incident waves whereby resultant incident waves will be generated which are augmented relative to the reflected waves.

3. A generator of high frequency energy transmitting waves in an elastic wave transmitting medium, comprising a primary wave generator having operative contact with the medium, means for supplying energy to said primary wave generator, and a secondary wave generator for producing a secondary wave in said medium of an integer multiple frequency of the primary wave, means synchronizing the operation of the generators to produce primary and secondary waves of an adjustable, predetermined phase difference in said medium.

4. A generator of high frequency energy transmitting waves in an elastic wave transmitting medium, comprising a primary wave generator having operative contact with the medium, means for supplying energy to said primary wave generator, means for producing a secondary wave in said medium of substantially the same or multiple frequency as the primary wave, said last means comprising first and second stage secondary wave generators for producing secondary waves in said medium of substantially the same or multiple frequency as the primary wave, driving means for said secondary wave generators, means for varying the timing of the secondary wave generators whereby to variably control the phase relationship of the secondary waves to the primary wave.

5. A generator of high frequency energy transmitting waves in an elastic wave transmitting medium, consisting of a primary wave generator having operative contact with the medium with means for supplying energy to said primary wave generator, and means for producing a secondary wave in said medium of substantially the same or multiple frequency as the primary wave, said producing means including secondary basic and secondary auxiliary wave generators for producing basic and auxiliary wave components respectively of said secondary wave in said medium, said component waves being of substantially the same or multiple frequency as said primary wave, driving means for said basic wave and said auxiliary wave generators, means for synchronizing said driving means to maintain an adjustable phase relationship between said basic and auxiliary component waves and said primary wave.

6. A generator of high frequency energy transmitting waves in an elastic wave transmitting medium, consisting of a primary wave generator having operative contact with the medium, an operating mechanism for said primary wave generator, means for producing secondary waves in said medium of substantially the same or multiple frequency as the primary wave for combining therewith, said producing means including first and second stage secondary wave generators, one of said secondary wave generators consisting of a basic energy input member and an auxiliary energy input member, first and second driving means for imparting periodic motion to said basic and auxiliary input members respectively, means connecting said first and second driving means in an adjustable, timed relation, means connecting said first and second stage generators in adjustable timed relation.

7. An apparatus for generating and transmitting energy by high frequency waves in an elastic liquid medium, which comprises basic and auxiliary energy input members each operatively contacting said medium, first and second driving means for imparting periodic motion to said basic and auxiliary input members respectively adjustable connecting means synchronizing said first and second driving means whereby the basic and auxiliary waves generated will have a predetermined phase relation, means for introducing a readily vaporizable liquid into said liquid medium in a zone which is adjacent one of said input members but is beyond the region of longitudinal movement of the liquid medium adjacent the last mentioned input member.

8. An apparatus for generating and transmitting energy by high frequency waves in an elastic liquid medium, which comprises basic and auxiliary energy input members each operatively contacting said medium, first and second driving means for imparting periodic motion to said basic and auxiliary input members respectively, adjustable connecting means synchronizing said first and second driving means whereby the basic and auxiliary waves generated will have a predetermined phase relation, means for introducing carbon dioxide into said liquid medium in a zone which is adjacent one of said input members but is beyond the region of the longitudinal movement of the liquid medium adjacent the last mentioned input member.

9. Means for treating oil bearing formations with energy transmitted by high frequency waves, comprising an apparatus for generating high frequency energy waves and an elastic wave transmitting medium operatively connecting said apparatus to an energy receiving formation, said apparatus comprising a generator of high frequency energy transmitting waves in an elastic wave transmitting medium and comprising a basic energy input member having contact with the medium, a first driving means for imparting periodic motion to said basic input member, an auxiliary energy input member having contact with the medium, a second driving means for imparting periodic motion to said auxiliary input member, means connecting said first and second driving means in adjustable, timed relation.

10. Means for treating oil bearing formations with energy transmitted by high frequency waves, comprising an apparatus for generating high frequency energy waves and an elastic wave transmitting medium operatively connecting said apparatus to an energy receiving formation, said apparatus comprising a generator of high frequency energy transmitting waves in an elastic wave transmitting medium consisting of a primary wave generator having contact with the medium with means for supplying energy to said primary wave generator and a secondary wave generator for producing a secondary wave in said medium of substantially the same or multiple frequency as the primary wave, means synchronizing the operation of the generators to produce primary and secondary waves of an adjustable, predetermined phase difference in said medium.

11. Means for treating oil bearing formations with energy transmitted by high frequency waves, comprising an apparatus for generating high frequency energy waves and an elastic wave transmitting medium operatively connecting said apparatus to an energy receiving formation, said apparatus comprising a generator of high frequency energy transmitting waves in an elastic wave transmitting medium consisting of a primary wave generator having operative contact with the medium, an operating mechanism for said primary wave generator, means for producing secondary waves in said medium of substantially the same or multiple frequency as the primary wave for combining therewith, said producing means including first and second stage secondary wave generators, one of said secondary wave generators consisting of a basic energy input member and an auxiliary energy input member, first and second driving means for imparting periodic motion to said basic and auxiliary input members respectively, means connecting said first and second stage generators in adjustable timed relations.

12. Means for treating oil bearing formations with energy transmitted by high frequency waves, comprising an apparatus for generating high frequency energy waves and an elastic wave transmitting medium operatively connecting said apparatus to an energy receiving formation, said apparatus comprising a generator of high frequency energy transmitting waves in an elastic wave transmitting medium, consisting of a primary wave generator having operative contact with the medium with means for supplying energy to said primary wave generator, and means for producing a secondary wave in said medium of substantially the same or multiple frequency as the primary wave, said producing means including a secondary basic and secondary auxiliary wave generators for producing basic and auxiliary wave components respectively of said secondary wave in said medium, said component waves being of substantially the same or multiple frequency as said primary wave, driving means for said basic wave and said auxiliary wave generators, means for synchronizing said driving means to maintain an adjustable phase relationship between said basic and auxiliary component waves and said primary wave.

13. Means for treating oil bearing formations with energy transmitted by high frequency waves, comprising an apparatus for generating high frequency energy waves and an elastic wave transmitting medium operatively connecting said apparatus to said energy receiving formation, said apparatus comprising a generator of high frequency energy transmitting waves in an elastic wave transmitting medium consisting of a primary wave generator having operative contact with the medium, an operating mechanism for said primary wave generator, means for producing secondary waves in said medium of substantially the same or multiple frequency as the primary wave for combining therewith, said producing means including first and second stage secondary wave generators, one of said secondary wave generators consisting of a basic energy input member and an auxiliary energy input member, first and second driving means for imparting periodic motion to said basic and auxiliary input members respectively, means connecting said first and second driving means in adjustable, timed relation, means connecting said first and second stage generators in adjustable timed relation.

14. Means for treating oil bearing formations with energy transmitted by high frequency waves, comprising an apparatus for generating high frequency energy waves and an elastic wave transmitting medium operatively connecting said apparatus to an energy receiving formation, said apparatus comprising basic and auxiliary energy wave generators each operatively contacting said medium, first and second driving means for imparting periodic motion to said basic and auxiliary input members respectively, adjustable connecting means synchronizing said first and second driving means whereby the basic and auxiliary waves generated will have a predetermined phase relation, means for introducing a fluid into said medium in a zone adjacent one of said input members where a periodic rarefaction exists in the medium.

15. Means for treating oil bearing formations with energy transmitted by high frequency waves, comprising an apparatus for generating high frequency energy waves and an elastic wave transmitting medium operatively connecting said apparatus to an energy receiving formation, said apparatus comprising a mechanism for generating and transmitting energy by high frequency waves in an elastic liquid medium, which mechanism comprises basic and auxiliary energy input members each operatively contacting said medium, first and second driving means for imparting periodic motion to said basic and auxiliary input members respectively, adjustable connecting means synchronizing said first and second driving means whereby the basic and auxiliary waves generated will have a predetermined phase relation, means for introducing a liquid into said medium in a zone adjacent one of said input members where a periodic rarefaction exists in the medium.

16. Means for treating oil bearing formations with energy transmitted by high frequency waves, comprising an apparatus for generating high frequency energy waves and an elastic wave transmitting medium operatively connecting said apparatus to an energy receiving formation, said apparatus comprising a mechanism for generating and transmitting energy by high frequency waves in an elastic liquid medium, which mechanism comprises basic and auxiliary energy input members each operatively contacting said medium, first and second driving means for imparting periodic motion to said basic and auxiliary input members respectively, adjustable connecting means synchronizing said first and second driving means whereby the basic and auxiliary waves generated will have a predetermined phase relation, means for introducing a carbon dioxide into said liquid medium in a zone which is adjacent one of said input members but is beyond the region of longitudinal movement of the liquid medium adjacent the last mentioned input member.

17. Means for treating oil bearing formations with energy transmitted by high frequency waves, comprising an apparatus for generating high frequency energy waves and an elastic wave transmitting medium operatively connecting said apparatus to an energy receiving formation, said apparatus comprising a mechanism for generating and transmitting energy by high frequency waves in an elastic liquid medium, which mechanism comprises basic and auxiliary energy input members each operatively contacting said medium, first and second driving means for imparting periodic motion to said basic and auxiliary input members respectively, adjustable connecting means synchronizing said first and second driving means whereby the basic and auxiliary waves generated will have a predetermined phase relation, means for introducing a readily vaporizable liquid into said liquid medium in a zone which is adjacent one of said input members but is beyond the region of longitudinal movement of the liquid medium adjacent the last mentioned input member.

18. An apparatus for producing energy transmitting waves in an elastic liquid medium consisting of a generator of periodic waves and a liquid wave transmitting medium in contact therewith, said generator comprising an energy input member having operative contact with said liquid medium, means for imparting periodic motion to said input member and thereby producing a periodic wave in said liquid medium, said last means comprising a crank shaft and a connecting rod connected to said crank shaft and to said input member, means for adjusting the length of said connecting rod and means for varying the crank throw whereby to vary the speed of the input member during selected portions of its travel, means for intermittently introducing liquid into the liquid medium at a period and region where a rarefaction exists in the medium.

19. An apparatus for producing energy transmitting waves in an elastic liquid medium consisting of a generator of periodic waves and a liquid wave transmitting medium in contact therewith, said generator comprising an energy input member having operative contact with said liquid medium, means for imparting periodic motion to said input member and thereby producing a periodic wave in said liquid medium, said last means comprising a crank shaft and a connecting rod connected to said crank shaft and to said input member, means for adjusting the length of said connecting rod and means for varying the crank throw to vary the speed of the input member during selected portions of its travel, means for intermittently introducing liquid into the liquid medium at a period and region where a rarefaction exists in the medium, adjusting means to controllably vary the timing of the last mentioned means.

20. A generator of high frequency energy transmitting waves in an elastic wave transmitting fluid medium, comprising a primary wave generator having operative contact with the medium, means for supplying energy to said primary wave generator, means for producing a secondary wave in said medium of substantially the same or multiple frequency as the primary wave, said last means including a fluid discharge means for emitting fluid from said medium, a valve controlling said fluid discharge means, actuating means for opening and closing said valve to produce hammer shock waves in said fluid medium, driving means for said actuating means for varying the timing of the secondary wave producer whereby to variably control the phase relationship of the secondary wave to the primary wave, means for varying the rate of closure of said valve independently of said actuating means.

21. A generator of high frequency energy transmitting waves in an elastic wave transmitting fluid medium, consisting of a primary wave generator having operative contact with the medium with means for supplying energy to said primary wave generator, and means for producing a secondary wave in said medium of substantially the same or multiple frequency as the primary wave, said producing means including secondary basic and secondary auxiliary wave generators for producing basic and auxiliary wave components respectively of said secondary wave in said medium, said component waves being of substantially the same or multiple frequency as said primary wave, driving means for said basic wave and said auxiliary wave generators, one of said generators including a fluid discharge means in communication with said fluid medium for emitting fluid from said medium, a valve controlling said fluid discharge means, actuating means for opening and closing said valve to produce hammer shock waves in said fluid medium, means for synchronizing said driving means to maintain an adjustable phase relationship between said basic and auxiliary component waves and said primary wave.

22. A generator of high frequency energy transmitting waves in an elastic wave transmitting fluid medium, consisting of a primary wave generator having operative contact with the medium, an operating mechanism for said primary wave generator, means for producing secondary waves in said medium of substantially the same or multiple frequency as the primary wave for combining therewith, said producing means including first and second stage secondary wave generators, one of said secondary wave generators consisting of a basic energy input member and an auxiliary energy input member first and second driving means for imparting periodic motion to said basic and auxiliary input members respectively, means connecting said first and second driving means in an adjustable, timed relation, means connecting said first and second stage generators in adjustable timed relation, said one of said secondary wave generators including a fluid discharge means for emitting fluid from said medium, a valve controlling said fluid discharge means, actuating means for opening and closing said valve to produce hammer shock waves in said fluid medium, said basic energy input member being connected to said actuating means.

23. A generator of high frequency energy transmitting waves in an elastic wave transmitting fluid medium, comprising a primary wave generator having operative contact with the medium, means for supplying energy to said primary wave generator, means for producing a secondary wave in said medium of substantially the same or multiple frequency as the primary wave, said last means including a fluid discharge means for emitting fluid from said medium, a valve controlling said fluid discharge means, actuating means for opening and closing said valve to produce hammer shock waves in said fluid medium, driving means for said actuating means for varying the timing of the secondary wave producer whereby to variably control the phase relationship of the secondary wave to the primary wave, means for varying the rate of closure of said valve independently of said actuating means, said last means comprising a dash pot connected to said valve.

24. A generator of high frequency energy transmitting waves in an elastic wave transmitting fluid medium, consisting of a primary wave generator having operative contact with the medium with means for supplying energy to said primary wave generator, and means for producing a secondary wave in said medium of substantially the same or multiple frequency as the primary wave, said producing means including secondary basic and secondary auxiliary wave generators for producing basic and auxiliary wave components respectively of said secondary wave in said medium, said component waves being of substantially the same or multiple frequency as said primary wave, driving means for said basic wave and said auxiliary wave generators, one of said generators including a fluid discharge means in communication with said fluid medium for emitting fluid from said medium, a valve controlling said fluid discharge means, actuating means for opening and closing said valve to produce hammer shock waves in said fluid medium, means for synchronizing said driving means to maintain an adjustable phase relationship between said basic and auxiliary component waves and said primary wave, said last means comprising a dashpot connected to said valve.

25. A generator of high frequency energy transmitting waves in an elastic wave transmitting fluid medium, consisting of a primary wave generator having operative contact with the medium, an operating mechanism for said primary wave generator, means for producing secondary waves in said medium of substantially the same or multiple frequency as the primary wave for combining therewith, said producing means including first and second stage secondary wave generators, one of said secondary wave generators consisting of a basic energy input member and an auxiliary energy input member first and second driving means for imparting periodic motion to said basic and auxiliary input members respectively, means connecting said first and second driving means in an adjustable, timed relation, means connecting said first and second stage generators in adjustable timed relation, said one of said secondary wave generators including a fluid discharge means for emitting fluid from said medium, a valve controlling said fluid discharge means actuating means for opening and closing said valve to produce hammer shock waves in said fluid medium, said basic energy input member being connected to said actuating means, and means for varying the rate of closure of said valve independently of said actuating means.

26. An apparatus for generating and transmitting energy by high frequency waves in an elastic liquid medium, which comprises a plurality of energy input members each operatively contacting said medium, a plurality of driving means each imparting periodic motion to said input members, adjustable connecting means synchronizing said plurality of driving means whereby the waves generated thereby will have a predetermined and adjustable phase relation, means for introducing a readily vaporizable liquid into said liquid medium in a zone which is adjacent but is beyond the region of longitudinal movement of the liquid medium adjacent one of the said input members.

27. An apparatus for producing augmented high frequency energy transmitting waves in an elastic wave transmitting medium, consisting of a generator of high frequency periodic vibrations and an elastic wave transmitting medium in operative contact therewith, said generator comprising an energy input member having operative contact with said medium, means for imparting periodic motion to said input member and thereby producing a primary periodic wave in said medium, means for variably timing said motion imparting means to cause said input member to apply augmenting energy to said primary wave at a phase therein which will increase the energy contact of the resultant wave over that of the primary wave, said energy input member comprising a reciprocating piston having direct contact with the elastic medium, said means for imparting periodic motion comprising a crankshaft connected to said piston, said variable timing means comprising means for varying the effective length of the piston and its connection with the crankshaft.

28. A generator of high frequency energy transmitting waves in an elastic wave transmitting medium comprising a primary wave generator having operative contact with the medium, means for operating said primary wave generator, a pair of secondary wave generators each having operative contact with the medium, means for operating the secondary wave generators to thereby produce in said medium secondary waves each of a multiple frequency of that of the primary wave, means operatively connecting the secondary generators to the primary generator whereby the phase relation of the secondary waves with respect to the primary wave may be independently varied.

29. The combination of claim 3 wherein said secondary wave generator consisting of a basic energy input member and an auxiliary energy input member, a driving means for each of said input members for varying the phase relation therebetween.

References Cited in the file of this patent
UNITED STATES PATENTS

| | | |
|---|---|---|
| Re. 23,381 | Bodine | June 26, 1951 |
| 505,090 | Carse | Sept. 19, 1893 |
| 2,010,378 | Sassen | Aug. 6, 1935 |
| 2,553,336 | Sedgwick | May 15, 1951 |
| 2,572,977 | Bodine | Oct. 30, 1951 |
| 2,592,237 | Bradley | Apr. 8, 1952 |

FOREIGN PATENTS

| | | |
|---|---|---|
| 25,497 | Australia | Mar. 6, 1931 |